US006684216B1

(12) United States Patent
Duliba et al.

(10) Patent No.: US 6,684,216 B1
(45) Date of Patent: Jan. 27, 2004

(54) METHOD AND COMPUTER SYSTEM FOR PROVIDING INPUT, ANALYSIS, AND OUTPUT CAPABILITY FOR MULTIDIMENSIONAL INFORMATION

(75) Inventors: Katherine A. Duliba, 31 Pheasant Run, Edison, NJ (US) 08820; Paul R. Dorsey, Colonia, NJ (US)

(73) Assignee: Katherine A. Duliba, Edison, NJ (US)

( * ) Notice: Subject to any disclaimer, the term of this patent is extended or adjusted under 35 U.S.C. 154(b) by 187 days.

(21) Appl. No.: 09/668,136

(22) Filed: Sep. 25, 2000

Related U.S. Application Data

(60) Provisional application No. 60/156,561, filed on Sep. 29, 1999.

(51) Int. Cl.[7] .................................................. G06F 7/00
(52) U.S. Cl. ..................................... 707/102; 707/104.1
(58) Field of Search .............................. 707/102, 104.1

(56) References Cited

U.S. PATENT DOCUMENTS

| | | | | |
|---|---|---|---|---|
| 5,701,453 A | * | 12/1997 | Maloney et al. ................ 707/2 |
| 5,774,866 A | * | 6/1998 | Horwitz et al. ................. 705/7 |
| 5,867,281 A | * | 2/1999 | Nozoe et al. ................. 358/402 |
| 5,940,476 A | * | 8/1999 | Morganstein et al. .... 379/88.02 |
| 5,974,407 A | * | 10/1999 | Sacks ............................ 707/2 |
| 5,995,969 A | * | 11/1999 | Lee et al. .................... 707/100 |
| 5,999,192 A | * | 12/1999 | Selfridge et al. ........... 345/440 |
| 6,003,035 A | * | 12/1999 | Breame ....................... 707/102 |
| 6,035,300 A | * | 3/2000 | Cason et al. ................. 707/102 |
| 6,052,693 A | * | 4/2000 | Smith et al. ............... 707/104.1 |
| 6,061,690 A | * | 5/2000 | Nori et al. .............. 707/103 R |
| 6,067,548 A | * | 5/2000 | Cheng .................... 707/103 R |
| 6,134,540 A | * | 10/2000 | Carey et al. ................... 707/2 |
| 6,161,103 A | * | 12/2000 | Rauer et al. ................... 707/4 |
| 6,185,560 B1 | * | 2/2001 | Young et al. .................. 707/6 |
| 6,212,673 B1 | * | 4/2001 | House et al. ............... 717/100 |
| 6,253,368 B1 | * | 6/2001 | Nelin et al. ................. 717/124 |
| 6,338,053 B2 | * | 1/2002 | Uehara et al. ................. 707/1 |
| 6,341,279 B1 | * | 1/2002 | Nye .............................. 707/3 |
| 6,341,287 B1 | * | 1/2002 | Sziklai et al. ............... 707/102 |
| 6,360,223 B1 | * | 3/2002 | Ng et al. .................... 707/100 |
| 6,363,394 B1 | * | 3/2002 | Rajarajan et al. ........... 707/102 |
| 6,374,252 B1 | * | 4/2002 | Althoff et al. .............. 707/102 |
| 6,405,211 B1 | * | 6/2002 | Sokol et al. ............. 707/103 Y |
| 6,448,981 B1 | * | 9/2002 | Kaczmarski ................ 345/763 |
| 6,480,842 B1 | * | 11/2002 | Agassi et al. .................. 707/4 |

* cited by examiner

*Primary Examiner*—Wayne Amsbury
*Assistant Examiner*—Brian Goddard
(74) *Attorney, Agent, or Firm*—Pillsbury Winthrop LLP

(57) ABSTRACT

A method includes creating and storing in various relational database tables: a biz metrix, by articulating variables that will appear on the metrix; biz metrix components; structure or relationships of the biz metrix; data elements that will appear on the metrix, including a text field storing a rule; defining the rule; creating and storing the metrix itself; metrix details; and potential types of subjects of the biz metrix.

13 Claims, 31 Drawing Sheets

TRANSACTION

| Attribute Name | Seq. | Opt. | Format | Length | Decimal |
|---|---|---|---|---|---|
| TRANSACTION_CD | 10 | N | VARCHAR2 | 7 | |
| NAME_TX | 20 | N | VARCHAR2 | 40 | |
| DESCR_TX | 30 | Y | VARCHAR2 | 2000 | |

```
TRANSACTION_DTL
Attribute Name              Seq.   Opt.   Format     Length    Decimal
TRANSACTION_DTL_ID           10     N     VARCHAR2      7
TRANSACTION_CD_FK            20     N     VARCHAR2      7
TRANSACTION_DTL_ID_RFK       30     N     VARCHAR2      7
DATE_TX                      40     N     DATE
```

FIG. 1C

Transaction

| Transaction_CD | Name_TX | Descr_TX |
|---|---|---|
| Buy_Prod | Buy product transaction | This transaction relates to a customer buying a product. |
| Sell_Prod | Sell product transaction | This transaction to a vendor selling a product. |

FIG. 1D

Transaction_Detail

| Transaction_Dtl_ID | Transaction_CD_FK | Date_DT |
|---|---|---|
| 1 | Buy_Prod | 11/01/1999 |
| 2 | Buy_Prod | 11/05/1999 |
| 3 | Sell_Prod | 11/01/1999 |

FIG. 1E

Income Statement, January 1999
Global Corporation

Revenues

| | Amount |
|---|---|
| Software | $250,000 |
| Hardware | $100,000 |
| Services | $75,000 |

Expenses

| | Amount |
|---|---|
| Salary | $200,000 |
| Rent | $50,000 |

Income Statement, January 1999
Global Corporation

1

2 Revenues

| | | Amount |
|---|---|---|
| 3 | Software | $250,000 |
| 4 | Hardware | $100,000 |
| 5 | Services | $75,000 |

6 Expenses

| | | Amount |
|---|---|---|
| 7 | Salary | $200,000 |
| 8 | Rent | $50,000 |

BIZ_METRIX

| Attribute Name | Seq. | Opt. | Format | Length | Decimal |
|---|---|---|---|---|---|
| BIZ_METRIX_CD | 10 | N | VARCHAR2 | 7 | |
| Z_METRIX_CD | 20 | N | VARCHAR2 | 7 | |
| Z_FREQ_CD | 30 | Y | VARCHAR2 | 7 | |
| PARTY_ID_FK | 35 | Y | NUMBER | 10 | |
| NAME_TX | 40 | N | VARCHAR2 | 40 | |
| DESCR_TX | 50 | Y | VARCHAR2 | 200 | |

FIG. 9-A

BIZ_METRIX_REL

| Attribute Name | Seq. | Opt. | Format | Length | Decimal |
|---|---|---|---|---|---|
| BIZ_METRIX_REL_ID | 10 | N | NUMBER | 10 | |
| BIZ_METRIX_REL_ID_RFK | 20 | Y | VARCHAR2 | 7 | |
| BIZ_METRIX_CD_FK | 30 | N | VARCHAR2 | 7 | |
| MIN_TIMES_NR | 40 | Y | NUMBER | 4 | |
| MAX_TIMES_NR | 50 | Y | NUMBER | 4 | |

FIG. 9-B

BIZ_METRIX_RULE

| Attribute Name | Seq. | Opt. | Format | Length | Decimal |
|---|---|---|---|---|---|
| BIZ_METRIX_RULE_ID | 10 | N | NUMBER | 10 | |
| BIZ_METRIX_CD_FK | 20 | N | VARCHAR2 | 7 | |
| PARTY_ID_FK | 35 | N | NUMBER | 10 | |
| PARTY_ROLE_CD_FK | 40 | Y | VARCHAR2 | 7 | |

FIG. 9-C

BIZ_METRIX_VAR

| Attribute Name | Seq. | Opt. | Format | Length | Decimal |
|---|---|---|---|---|---|
| BIZ_METRIX_VAR_ID | 10 | N | NUMBER | 10 | |
| DOMAIN_CD_FK | 15 | N | VARCHAR2 | 7 | |
| NAME_TX | 30 | N | VARCHAR2 | 40 | |
| DESCR_TX | 40 | Y | VARCHAR2 | 2000 | |
| SQL_TX | 50 | Y | VARCHAR2 | 2000 | |

FIG. 9-D

BIZ_METRIX_DTL

| Attribute Name | Seq. | Opt. | Format | Length | Decimal |
|---|---|---|---|---|---|
| BIZ_METRIX_DTL_ID | 10 | N | NUMBER | 10 | |
| BIZ_METRIX_CD_FK | 12 | N | VARCHAR2 | 7 | |
| BIZ_METRIX_VAR_ID_FK | 15 | Y | NUMBER | 10 | |
| Z_METRIX_DTL_CD | 20 | N | VARCHAR2 | 7 | |
| LABEL_TX | 30 | Y | VARCHAR2 | 40 | |
| RULE_VALID_TX | 33 | Y | VARCHAR2 | 2000 | |
| RULE_GENER_TX | 35 | Y | VARCHAR2 | 2000 | |
| DEFLT_TX | 40 | Y | VARCHAR2 | 40 | |
| REQD_YN | 50 | Y | CHAR | 1 | |

FIG. 9-E

GEN_METRIX

| Attribute Name | Seq. | Opt. | Format | Length | Decimal |
|---|---|---|---|---|---|
| GEN_METRIX_ID | 10 | N | NUMBER | 10 | |
| GEN_METRIX_ID_RFK | 12 | Y | NUMBER | 10 | |
| BIZ_METRIX_CD_FK | 13 | N | VARCHAR2 | 7 | |
| PARTY_ID_FK | 15 | N | NUMBER | 10 | |
| COB_TABLE_CD_FK | 17 | Y | VARCHAR2 | 7 | |
| COB_LINK_ID | 20 | Y | NUMBER | 10 | |
| COB_LINK_CD | 30 | Y | VARCHAR2 | 7 | |
| Z_PERIOD_CD | 40 | N | VARCHAR2 | 7 | |
| Z_STS_CD | 50 | N | VARCHAR2 | 7 | |
| DOC_DT | 70 | Y | DATE | | |
| CALC_DT | 80 | Y | DATE | | |
| OBSRV_START_DT | 90 | Y | DATE | | |
| OBSRV_END_DT | 100 | Y | DATE | | |
| DESCR_TX | 110 | Y | VARCHAR2 | 2000 | |

FIG. 9-F

METRIX_GEN_DTL

| Attribute Name | Seq. | Opt. | Format | Length | Decimal |
|---|---|---|---|---|---|
| METRIX_GEN_DTL_ID | 10 | N | NUMBER | 10 | |
| GEN_METRIX_ID_FK | 20 | N | NUMBER | 10 | |
| BIZ_METRIX_VAR_ID_FK | 25 | Y | NUMBER | 10 | |
| Z_METRIX_DTL_CD | 30 | Y | VARCHAR2 | 7 | |
| VALUE_TX | 40 | Y | VARCHAR2 | 2000 | |
| VALUE_NR | 50 | Y | NUMBER | | 5 |
| VALUE_DT | 60 | Y | DATE | | |
| REQD_YN | 70 | Y | CHAR | 1 | |
| LABEL_TX | 80 | Y | VARCHAR2 | 40 | |

FIG. 9-G

PARTY

| Attribute Name | Seq. | Opt. | Format | Length | Decimal |
|---|---|---|---|---|---|
| PARTY_ID | 10 | N | NUMBER | 10 | |
| PARTY_NAME_TX | 15 | Y | VARCHAR2 | 100 | |
| LAST_NAME_TX | 16 | Y | VARCHAR2 | 40 | |
| FIRST_NAME_TX | 17 | Y | VARCHAR2 | 40 | |
| PERSON_YN | 20 | Y | CHAR | 1 | |
| START_DT | 30 | N | DATE | | |
| END_DT | 40 | Y | DATE | | |

FIG. 9-H

PARTY_ROLE

| Attribute Name | Seq. | Opt. | Format | Length | Decimal |
|---|---|---|---|---|---|
| PARTY_ROLE_ID | 10 | N | NUMBER | 10 | |
| PARTY_ROLE_ID_RFK | 15 | Y | NUMBER | 10 | |
| PARTY_ID_FK | 20 | N | NUMBER | 10 | |
| Z_PARTY_CD | 30 | N | VARCHAR2 | 7 | |
| Z_REL_CD | 40 | Y | VARCHAR2 | 7 | |
| START_DT | 50 | N | DATE | | |
| END_DT | 60 | Y | DATE | | |

FIG. 9-I

DEF_PARTY_REL

| Attribute Name | Seq. | Opt. | Format | Length | Decimal |
|---|---|---|---|---|---|
| DEF_PARTY_REL_ID | 10 | N | NUMBER | 10 | |
| PARTY_ROLE_ID_FK | 20 | N | NUMBER | 10 | |
| Z_PARTY_CD_CHILD | 30 | N | VARCHAR2 | 7 | |
| Z_PARTY_CD | 40 | Y | VARCHAR2 | 7 | |
| Z_REL_CD | 50 | Y | VARCHAR2 | 7 | |
| PERSON_YN | 55 | Y | CHAR | 1 | |
| START_DT | 60 | N | DATE | | |
| END_DT | 70 | Y | DATE | | |

*FIG. 9-J*

DOMAIN

| Attribute Name | Seq. | Opt. | Format | Length | Decimal |
|---|---|---|---|---|---|
| DOMAIN_CD | 10 | N | VARCHAR2 | 7 | |
| Z_DATA_CD | 20 | N | VARCHAR2 | 7 | |
| NAME_TX | 30 | Y | VARCHAR2 | 100 | |
| DESCR_TX | 40 | Y | VARCHAR2 | 2000 | |
| DEFAULT_TX | 50 | Y | VARCHAR2 | 100 | |
| SQL_TX | 60 | Y | VARCHAR2 | 2000 | |
| VALID_RULE_TX | 70 | Y | VARCHAR2 | 2000 | |
| MIN_NR | 80 | Y | NUMBER | 5 | |
| MAX_NR | 90 | Y | NUMBER | 10 | |
| PRECIS_NR | 100 | Y | NUMBER | 10 | |
| LENGTH_NR | 110 | Y | NUMBER | 10 | |

*FIG. 9-K*

VIRTUAL_ATTRIB

| Attribute Name | Seq. | Opt. | Format | Length | Decimal |
|---|---|---|---|---|---|
| VIRTUAL_ATTRIB_CD | 10 | N | VARCHAR2 | 7 | |
| DOMAIN_CD_FK | 20 | N | VARCHAR2 | 7 | |
| DATA_TYPE_CD | 60 | Y | VARCHAR2 | 7 | |
| RULE_TX | 70 | Y | VARCHAR2 | 2000 | |

FIG. 9-L

VALUE_LIST

| Attribute Name | Seq. | Opt. | Format | Length | Decimal |
|---|---|---|---|---|---|
| VALUE_LIST_ID | 10 | N | NUMBER | 10 | |
| VIRTUAL_ATTRIB_CD_FK | 13 | N | VARCHAR2 | 7 | |
| DOMAIN_CD_FK | 15 | Y | VARCHAR2 | 7 | |
| BIZ_METRIX_VAR_CD_FK | 17 | Y | VARCHAR2 | 7 | |
| VALUE_NR | 20 | Y | NUMBER | 10 | |
| VALUE_TX | 30 | Y | VARCHAR2 | 2000 | |
| VALUE_DT | 40 | Y | DATE | | |

FIG. 9-M

COB_TABLE

| Attribute Name | Seq. | Opt. | Format | Length | Decimal |
|---|---|---|---|---|---|
| COB_TABLE_CD | 10 | N | VARCHAR2 | 7 | |
| NAME_TX | 20 | N | VARCHAR2 | 40 | |
| COB_LINK_ID_TX | 30 | Y | VARCHAR2 | 100 | |
| SQL_SELECT_TX | 60 | Y | VARCHAR2 | 200 | |
| SQL_FROM_TX | 70 | Y | VARCHAR2 | 200 | |
| SQL_WHERE_TX | 80 | Y | VARCHAR2 | 200 | |
| DESCR_TX | 90 | Y | VARCHAR2 | 2000 | |
| OWNER_TX | 100 | Y | VARCHAR2 | 100 | |

FIG. 9-N

COB_TABLE_DTL

| Attribute Name | Seq. | Opt. | Format | Length | Decimal |
|---|---|---|---|---|---|
| COB_TABLE_DTL_CD | 10 | N | VARCHAR2 | 7 | |

FIG. 9-O

| VIRTUAL_VALUE Attribute Name | Seq. | Opt. | Format | Length | Decimal |
|---|---|---|---|---|---|
| VIRTUAL_VALUE_ID | 10 | N | NUMBER | 10 | |
| VIRTUAL_VALUE_ID_RFK | 15 | Y | VARCHAR2 | 7 | |
| VIRTUAL_ATTRIB_CD_FK | 20 | N | VARCHAR2 | 7 | |
| PARTY_ID_FK | 23 | Y | NUMBER | 10 | |
| COB_TABLE_CD_FK | 25 | Y | VARCHAR2 | 7 | |
| COB_LINK_ID | 40 | Y | NUMBER | 10 | |
| COB_LINK_CD | 50 | Y | VARCHAR2 | 7 | |
| VALUE_NR | 60 | Y | NUMBER | 10 | |
| VALUE_TX | 70 | Y | VARCHAR2 | 2000 | |
| VALUE_DT | 80 | Y | DATE | | |

FIG. 9-P

| VALID_VAR_RULE Attribute Name | Seq. | Opt. | Format | Length | Decimal |
|---|---|---|---|---|---|
| VALID_VAR_RULE_ID | 10 | N | NUMBER | 10 | |
| PARTY_ID_FK | 20 | Y | NUMBER | 10 | |
| PARTY_ROLE_CD_FK | 25 | Y | VARCHAR2 | 7 | |
| COB_TABLE_CD_FK | 30 | N | VARCHAR2 | 7 | |
| COB_LINK_ID | 33 | Y | NUMBER | 10 | |
| COB_LINK_CD | 36 | Y | VARCHAR2 | 7 | |
| START_DT | 40 | N | DATE | | |
| END_DT | 50 | Y | DATE | | |

FIG. 9-Q

VALID_VAR_RULE_DTL

| Attribute Name | Seq. | Opt. | Format | Length | Decimal |
|---|---|---|---|---|---|
| VALID_VAR_RULE_DTL_ID | 10 | N | NUMBER | 10 | |
| VALID_VAR_RULE_ID_FK | 20 | N | NUMBER | 10 | |
| VIRTUAL_ATTRIB_CD_FK | 30 | N | VARCHAR2 | 7 | |
| MIN_TIMES_NR | 40 | Y | NUMBER | 5 | |
| MAX_TIMES_NR | 50 | Y | NUMBER | 5 | |

FIG. 9R

FUNCTN

| Attribute Name | Seq. | Opt. | Format | Length | Decimal |
|---|---|---|---|---|---|
| FUNCTN_CD | 10 | N | VARCHAR2 | 7 | |
| DOMAIN_CD_FK | 15 | N | VARCHAR2 | 7 | |
| PARTY_ROLE_ID_FK | 17 | Y | NUMBER | 10 | |
| NAME_TX | 20 | N | VARCHAR2 | 40 | |
| SYNTX_TX | 30 | Y | VARCHAR2 | 2000 | |
| DESCR_TX | 40 | Y | VARCHAR2 | 2000 | |

FIG. 9-S

FUNCTN_DTL

| Attribute Name | Seq. | Opt. | Format | Length | Decimal |
|---|---|---|---|---|---|
| FUNCTN_DTL_CD | 10 | N | VARCHAR2 | 7 | |
| FUNCTN_CD_FK | 13 | N | VARCHAR2 | 7 | |
| DOMAIN_CD_FK | 18 | N | VARCHAR2 | 7 | |
| NAME_TX | 20 | N | VARCHAR2 | 40 | |
| MAY_REPEAT_YN | 30 | Y | CHAR | 1 | |
| REQD_YN | 40 | Y | CHAR | 1 | |
| DEFAULT_VAL_TX | 45 | Y | VARCHAR2 | 40 | |
| DESCR_TX | 50 | Y | VARCHAR2 | 2000 | |

FIG. 9-T

Biz Metrix

| Biz Metrix CD | Name TX | Party_ID FK | Z Metrix CD | Z Freq CD | Descr TX |
|---|---|---|---|---|---|
| INCSTMT | Income Statement | Global Corp. | Direct observation | Monthly | The income statement for the corporation. |
| REV | Revenue | Global Corp. | Direct observation | | The revenue for the corporation. |
| EXP | Expenses | Global Corp. | Direct observation | | The expenses for the corporation. |
| FIN | Financial Details | Global Corp. | Direct observation | | The specific details; they can be related to revenues or expenses. |

FIG. 10-A

Biz Metrix Relationship

| Biz Metrix Rel_ID | Biz Metrix CD FK | Biz Metrix Rel_CD RFK | Min Times NR | Max Times NR |
|---|---|---|---|---|
| 1 | INCSTMT | 1 (INCSTMT) | 1 | 1 |
| 2 | REV | 1 (INCSTMT) | 1 | 1 |
| 3 | EXP | 1 (INCSTMT) | 1 | 1 |
| 4 | FIN | 2 (REV) | 0 | 999 |
| 5 | FIN | 3 (EXP) | 0 | 999 |

FIG. 10-B

Biz Metrix Rule

| Biz Metrix Rule ID | Biz Metrix CD FK | Party ID FK | Party Type CD FK |
|---|---|---|---|
| 1 | INCSTMT | 1 (Global Corp.) | Company |
| 2 | REV | 1 (Global Corp.) | Company |
| 3 | EXP | 1 (Global Corp.) | Company |
| 4 | FIN | 1 (Global Corp.) | Company |

FIG. 10-C

Biz Metrix Variables

| Biz Metrix Var ID | Name TX | Domain CD FK | Descr TX | SQL TX |
|---|---|---|---|---|
| 1 | Document Title | Title | The title of the document/metrix. | |
| 2 | Document Date | Date | The time period the document/metrix refers to. | |
| 3 | Organization Name | Name | The name of the relevant organization unit. | Select Party_ID, Party_Name_TX from Party |
| 4 | Document Produced Date | Date | The date the document/metrix was produced. | |
| 5 | Type | Text | The type of revenue or expense. | |
| 6 | Amount | Currency | The dollar amount of revenues or expenses. | |

FIG. 10-D

Biz Metrix Details

| Biz_Metrix_Dtl_ID | Biz_Metrix_D D_FK | Biz_Metrix_Var_ID FK | Z_Metrix_D TL_CD | Biz_Metrix_D Label_TX | Rule_Valid_TX | Rule_Gener_TX | Deflt_TX | Reqd_YN |
|---|---|---|---|---|---|---|---|---|
| 1 | INCSTMT | 1 (Doc Title) | Direct observation | | | | Income Statement | Y |
| 2 | INCSTMT | 2 (Doc Date) | Direct observation | | | | | Y |
| 3 | INCSTMT | 3 (Org Name) | Direct observation | | | | | Y |
| 4 | INCSTMT | 4 (Doc Produced Date) | Direct observation | | | | SysDate | Y |
| 5 | REV | 1 (Doc Title) | Direct observation | | | | Revenues | Y |
| 6 | EXP | 1 (Doc Title) | Direct observation | | | | Expenses | Y |
| 7 | FIN | 5 (Type) | Direct observation | | | | | Y |
| 8 | FIN | 6 (Amount) | Direct observation | Amount | | | | Y |

FIG. 10-E

Gen_Metrix

| Gen Metrix ID | Biz Metrix CD FK | Gen Metrix ID RFK | Party ID FK | COB Table CD FK | COB Link ID | COB Link CD |
|---|---|---|---|---|---|---|
| 1 | Income Statement | | 1 (Global Corp.) | | | |
| 2 | Revenues | 1 | 1 (Global Corp.) | | | |
| 3 | Financial Detail | 2 | 1 (Global Corp.) | | | |
| 4 | Financial Detail | 2 | 1 (Global Corp.) | | | |
| 5 | Financial Detail | 2 | 1 (Global Corp.) | | | |
| 6 | Expenses | 1 | 1 (Global Corp.) | | | |
| 7 | Financial Detail | 6 | 1 (Global Corp.) | | | |
| 8 | Financial Detail | 6 | 1 (Global Corp.) | | | |

Gen_Metrix (con't)

| Z Freq CD | Z Sts CD | Doc DT | Calc DT | Obsrv Start DT | Obsrv End DT | Descr TX |
|---|---|---|---|---|---|---|
| Monthly | | January, 1999 | | | | |
| Monthly | | January, 1999 | | | | |
| Monthly | | January, 1999 | | | | |
| Monthly | | January, 1999 | | | | |
| Monthly | | January, 1999 | | | | |
| Monthly | | January, 1999 | | | | |
| Monthly | | January, 1999 | | | | |
| Monthly | | January, 1999 | | | | |

FIG. 10-F

Metrix Gen Details

| Metrix_Gen_Dtl_ID | Gen_Metrix_ID_FK | Biz_Metrix_Var_ID_FK | Z_Metrix_Dtl_CD | Value_TX | Value_NR | Value_DT | Reqd_YN | Label_TX |
|---|---|---|---|---|---|---|---|---|
| 1 | 1 | Document Date | Entered | | | January, 1999 | Y | |
| 2 | 1 | Organization Name | Entered | Global Corporation | | | Y | |
| 3 | 1 | Document Produced Date | Entered | | | February 15, 1999 | Y | |
| 4 | 3 | Type | Entered | Software | | | Y | |
| 5 | 3 | Amount | Entered | | 250,000 | | Y | |
| 6 | 4 | Type | Entered | Hardware | | | Y | |
| 7 | 4 | Amount | Entered | | 100,000 | | Y | |
| 8 | 5 | Type | Entered | Services | | | Y | |
| 9 | 5 | Amount | Entered | | 75,000 | | Y | |
| 10 | 7 | Type | Entered | Salary | | | Y | |
| 11 | 7 | Amount | Entered | | 240,000 | | Y | |
| 12 | 8 | Type | Entered | Rent | | | Y | |
| 13 | 8 | Amount | Entered | | 50,000 | | Y | |

FIG. 10-6

Party

| Party_ID | Party Name TX | Last Name TX | First Name TX | Person YN | Start DT | End DT |
|---|---|---|---|---|---|---|
| 1 | Global Corp. | | | N | 02/02/1990 | |
| 2 | Division #1 | | | N | 10/08/1992 | |
| 3 | Division #2 | | | N | 05/01/1993 | |
| 4 | | Smith | John | Y | 05/15/1995 | 08/22/1997 |
| 5 | | Doe | John | Y | 06/20/1996 | |
| 6 | ABC Corp. | | | N | 08/01/1970 | 08/01/1998 |
| 7 | DEF Corp. | | | N | 08/02/1998 | |

FIG. 10-H

Party_Role

| Party Role ID | Party Role ID RFK | Party ID FK | Z Party CD | Z Rel CD | Start DT | End DT |
|---|---|---|---|---|---|---|
| 1 | | 1 (Global Corp.) | Company | | 02/02/60 | |
| 2 | 1 | 2 (Division #1) | Division | Part of | 10/08/66 | |
| 3 | 1 | 3 (Division #2) | Division | Part of | 05/01/75 | |
| 4 | 2 | 4 (John Smith) | Manager | Emp of | 05/15/95 | |
| 5 | 4 | 5 (George White) | Employee | Reports to | 06/20/96 | 08/22/97 |
| 6 | 3 | 5 (George White) | Manager | Emp of | 06/20/96 | 08/22/97 |
| 7 | 6 | 4 (John Smith) | Employee | Reports to | 05/15/95 | |

FIG. 10-I

Defined Party Relationships

| Def_Party_Rel_ID | Party_Role_ID_FK | Z_Party_CD | Z_Party_CD_Child | Z_Rel_CD | Person_YN | Start_DT | End_DT |
|---|---|---|---|---|---|---|---|
| 1 | 1 | Division | Department | Reports to | N | | |
| 2 | 1 | Department | Employee | Works for | Y | | |
| 3 | 1 | Division | Employee | Works for | Y | | |

FIG. 10-J

Domain

| Domain_CD | Z_Data_CD | Name_TX | Descr_TX | Default_TX | SQL_TX |
|---|---|---|---|---|---|
| Col | Text | Color | A color. | Black | Select color.name from color |
| Age | Numeric | Age | The age of a particular object. | | Select age.number from age |
| PostCD | Text | Postal Code | Canadian postal code. | | |
| CSI | Numeric | Customer Service Identifier | Allows a party to track CSI numbers. | | |
| Gen | Text | Gender | Gender | | |

Domain (con't)

| Valid_Rule_TX | Min_NR | Max_NR | Precis_NR | Length_NR |
|---|---|---|---|---|
| | | | | 20 |
| | 10 | 120 | 0 | 3 |
| Is_Cdn_Postal_Code_YN(value) | | | | 6 |
| | | | 0 | 10 |
| | | | | 1 |

FIG. 10-K

Virtual_Attrib

| Virtual_Attrib_CD | Domain_CD_FK | Data_Type_CD | Rule_TX |
|---|---|---|---|
| 1 | CSI | Numeric | |
| 2 | Col | Text | |
| 3 | Col | Text | |
| 4 | Number10 | Numeric | |

FIG. 10-L

Value_List

| Value_List_ID | Virtual_Attrib_CD_FK | Domain_CD_FK | Biz_Metrix_Var_CD_FK | Value_NR | Value_TX | Date_DT |
|---|---|---|---|---|---|---|
| 1 | | Col | | | Red | |
| 2 | | Col | | | Green | |
| 3 | | Col | | | Blue | |
| 4 | | Gen | | | Male | |
| 5 | | Gen | | | Female | |

FIG. 10-M

COB_Table

| COB_Table_CD | Name_TX | COB_Link_ID_TX | SQL_Select_TX | SQL_From_TX | SQL_Where_TX | Descr_TX | Owner_TX |
|---|---|---|---|---|---|---|---|
| Emp | Employee | Party_Role_ID | Party_Role_ID, Party_ID | Party_Role | Z_Party_CD ='Emp' | Virtual Employee Table | |
| Cust | Customer | Party_Role_ID | Party_Role_ID, Party_ID | Party_Role | Z_Party_CD ='Cust' | Virtual Customer Table | |

FIG. 10-N

COB_Table_Dtl

| COB_Table_Dtl_CD |
|---|
| Gen_Metrix |
| Gen_Secrty_Rule_Dtl |

FIG. 10-O

Virtual_Value

| Virtual_Value_ID | Virtual_Att rib_CD_FK | COB_T able_ CD_FK | Virtual_V alue_ID_R FK | Party_ID_ FK | COB_Link_ ID | COB_Link_ CD | Value_NR | Value_TX | Value_DT |
|---|---|---|---|---|---|---|---|---|---|
| 1 | 1 (CSI) | Cust | | | | | | Cust Service ID | |
| 2 | 1 (CSI) | Cust | | | | | | Nombre du service client | |

FIG. 10-P

Valid_Var_Rule

| Valid_Var_Rule_ID | Party_ID_FK | Party_Role_CD_FK | COB_Table_CD_FK | COB_LINK_ID | COB_LINK_CD | Start_DT | End_DT |
|---|---|---|---|---|---|---|---|
| 1 | 1 (ABC Company) | | Cust | | | 01/01/1995 | |
| 2 | 4 (John Smith) | | Emp | | | 01/01/1996 | |

FIG. 10-Q

Valid_Var_Rule_Dtl

| Valid_Var_Rule_Dtl_ID | Valid_Var_Rule_ID_FK | Virtual_Attrib_CD_FK | Min_Times_NR | Max_Times_NR |
|---|---|---|---|---|
| 1 | 1 | 1 | 1 | 3 |

FIG. 10-R

Functn

| Functn_CD | Domain_CD FK | Name TX | Party_Role_ID FK | Syntx TX | Descr TX |
|---|---|---|---|---|---|
| Max | Numeric | Maximum | | (value number) | Finds the maximum of a set of numbers. |
| Min | Numeric | Maximum | | (value number) | Finds the minimum of a set of numbers. |

FIG. 10-S

Functn_Dtl

| Functn_Dtl_CD | Functn_CD FK | Domain_CD FK | Name TX | May Repeat YN | Reqd YN | Default_Val_TX | Descr TX |
|---|---|---|---|---|---|---|---|
| 1 | Max | Age | Maximum | | | | |

FIG. 10-T

METHOD AND COMPUTER SYSTEM FOR PROVIDING INPUT, ANALYSIS, AND OUTPUT CAPABILITY FOR MULTIDIMENSIONAL INFORMATION

RELATED APPLICATIONS

This patent application is related to and claims priority under 35 USC §120 from co-pending provisional U.S. patent application No. 60/156,561, titled "Method and Computer System for Providing Input, Analysis, and Output Capability for Multidimensional Information," and filed Sep. 29, 1999, which is incorporated herein by reference.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention relates to method and computer systems which support flexible, user-defined data structures, together with the ability to support user-defined data markup language and rule processing. More specifically the present invention relates to a fifth-generation programming environment for end users, implemented in a relational or object-relational database, in a multiclient environment.

BACKGROUND AND SUMMARY

The rapidity of today's business environment demands that users continue to analyze more data in new and interesting ways. However, many business systems lack the capability for a user to generate new data analyses or reports. Further, employees frequently do not have the luxury of submitting new requirements to the system developers. And even in cases where users can provide developers with new requirements, typically the users must then wait long periods, possibly some months, to obtain the code from the developers, and then deliver the new data, analyses and reports to company management.

Consequently, users may turn to software development tools (such as, for example, spreadsheets) that they are familiar with. A spreadsheet is useful for tracking information over two dimensions (e.g., one spreadsheet, with rows and columns), and three dimensions (e.g., several spreadsheets in a workbook). However, there might be other dimensions over which the users need to analyze their data, e.g., to total four dimensions. An added dimension requires a series of complex, linked spreadsheets with formulas and cell addresses that are generally, by nature of their complexity, unstable and unreliable, through which the user regularly produces the analyses, reports, and graphics. If even one formula or cell address contains an error, the entire analysis may produce an incorrect and/or inappropriate result. Therefore, there is a great need for end users to be able to store, manipulate and display their own information in a stable and robust environment without lengthy delays in requesting support from professional programming staff.

As a result, there is a need for a data markup language that will allow a user to store and display complex information. Document processing methods have typically distinguished between a document's structure, format, or layout and the document's content. For example, one method employs so-called metacodes that can be used to divide the content into titles, paragraphs, words, and footnotes. Recently, XML ("Extended Markup Language") has achieved popularity through its use of tags and text, which allow users to define fields and content, thereby allowing users to share data.

Document processing methods and XML can be viewed as, and therefore suffer all the limitations associated with, flat file processing. Although the information can be stored in a database, because each text item is defined through the use of tags, these methods do not lend themselves to non-sequential (e.g., random) access. Flat file database deficiencies focus on a high level of data integrity problems, which was a prime motivator for the design and development of relational database systems. There is a need to explicitly specify complex relationships among the data or groups of data displayed in the report, and then to specify how the data and their relationships are displayed. A data markup language should allow the user to store and display multidimensional data and the relationships between the data.

Even some generalized object-oriented methods that allow users to create a table suffer from flat file processing deficiencies. In particular, they do not allow users to specify what the relationships are between tables if the user creates more than one table.

However, data markup languages are of insufficient capability for fifth-generation programming languages. Without the ability to manipulate multi-dimensional information easily, such languages are not useful enough to be adopted by end users. In particular, users expect to be able to enter an equation into a tool as easily as entering a formula into a spreadsheet. Users today will not write a program in a third generation language to manipulate data. Existing alternatives, such as, for example, most code generators or program generators, are inadequate because they do not store rules in a database, but instead store them in a third generation or procedural language.

There is also a need for users to define their own flexible data structures. A spreadsheet implicitly defines any data structure that a user wants, appropriate or inappropriate. Providing an environment in which a user can define a (flexible) data structure consistent with relational database design principles increases the quality of the data, the analytics of the data, and the reports generated based on the data. However, today's relational database design and development environments are mastered only by relational database designers and developers, not by end users.

Although online analytical processing databases typically store large amounts of data, they are generally inadequate for a flexible, user-defined database environment. These tools typically define a multi-dimensional database structure at the outset, and do not allow users to easily change the structure of the database. Online analytical processing or relational online analytical processing is a technique of designing a data warehouse where there is a central, pre-defined fact table, and central, pre-defined level of aggregation with some number of surrounding factor tables which define dimensionality of the fact table. If a user wanted to add another dimension to the analysis, the user would have to tell the database designer, who would then add another table to the database.

Finally, a fifth-generation programming language should be able to be deployed in a multiclient environment. With the advent of the World Wide Web as a customer interface to traditionally unseen, back-office applications, users may want to customize their systems for each client. To date, in a multiclient environment such as, for example, the Web, client-specific information has been captured through information stored on user's computers, e.g., so-called cookies. However, it is difficult to analyze and report on information contained in the cookies. Capturing the customized information in a relational database, however, easily supports analysis and reporting.

Given the above problems, the present invention provides novel methods and computer systems which support flexibly entering, storing, and displaying multi-dimensional information and analytics, in an efficient and effective manner (such as, for example, recursive data structures), while avoiding the shortcomings and drawbacks of prior methodologies.

The present invention allows users to identify and describe the variables or data elements of interest.

The system, according to the present invention, allows users to describe the structure of the variables, data, or data elements in a database, consistent with relational or object-relational principles.

The invention, in a further aspect, allows users to define, in a recursive manner, how different structural elements relate to each other, in a database consistent with relational or object-relational principles.

The present invention allows users, when processing multidimensional information, to define their data in such a way as to help minimize the number of complex, linked spreadsheets, filled with numbers, metrics, potentially incorrect and/or unstable formulas and cell addresses, thereby increasing the quality of the data and analytics associated with or derived from the information.

The present invention further provides such systems that allow users to manipulate the multidimensional data easily, by being able to enter equations into a tool (mechanism/program) that then generates corresponding third generation programming language code. This helps to further alleviate unstable cell formulas and cell addresses commonly associated with spreadsheet environments. A rule is not stored as a series of rule components with individual attributes in a relational database table, but simply as a character field which a user builds, preferably using a point and click interface.

The present invention provides methods and systems to allow users to display or print calculated variables in reports using a data markup language, implemented in a recursive manner.

In one important aspect, this invention provides a generic database structure that allows a user to define and store complex objects. A primary advantage of the generic database structure according to the present invention is that it is one consistent data model which captures both information, and the structure of that information, as data. Typically, database models capture only information as data, as the structure of the information is implicitly modeled using relational entities and relationships, and therefore is not stored as data. In other words, the generic database structure according to the present invention models not only the data, but also an abstraction of the data.

A comparison of a traditional system with the generic database structure according to the present invention illustrates this difference. In a traditional system, every company document or form is typically stored in a different database table, while the information is stored as data. The structure of the information is implicitly stored in the different database tables and their associated relationships. When any document changes, the database designer will need to change the system, that is, the attributes and tables. In the present invention, when any document changes, the user can change the system, because the structure of the information is just data in existing tables, without the need to add attributes and tables.

In addition, the number of tables in the generic database structure according to the present invention is independent of the number of documents. Traditionally, when every document or form is stored in a different database table, the system can easily grow to hundreds or thousands of tables. In the present invention, all company documents and forms are stored in seven tables.

Also, because there is one single, consistent data structure, a system developer can build just one set of flexible reports with which users can have a large amount of their reporting needs supported.

Because the present invention models both the data and the data structure, a wide variety of companies and industries (such as, e.g., a retailer or government organization) can implement the same system.

BRIEF DESCRIPTION OF THE DRAWINGS

For a more complete understanding of the invention, the following Detailed Description should be read in conjunction with the accompanying Drawings, wherein:

FIG. 1A is a schematic representation (logical, entity-relationship diagram) of a simple Transaction and Transaction Detail example;

FIGS. 1B–1C are physical schematic representations of various Entities, the various respective information fields thereof, the type of information contained therein, and the relationships contained therein;

FIG. 1D–1E are examples of sample data in various Entities and Tables shown in FIGS. 1B–1C;

FIG. 6A is an example of a metrix;

FIG. 6B is an example of a metrix, viewed recursively;

FIGS. 9-A to 9-T are physical schematic representations of various Entities, the various respective information fields thereof, the type of information contained therein, and the relationships contained therein;

FIGS. 10-A to 10-T are examples of sample data in various of the entities and tables;

DETAILED DESCRIPTION

The present invention is described with reference to various entity-relationship (ER) diagrams. This section first briefly describes how to interpret the ER diagrams, and their associated tables, as they are used in various Figures throughout this document. Entity-Relationship Diagrams are well-known in the art and have a specific, precise meaning to database designers and developers, and consist of two major parts: entities, and relationships.

Figures 1A, 1B:
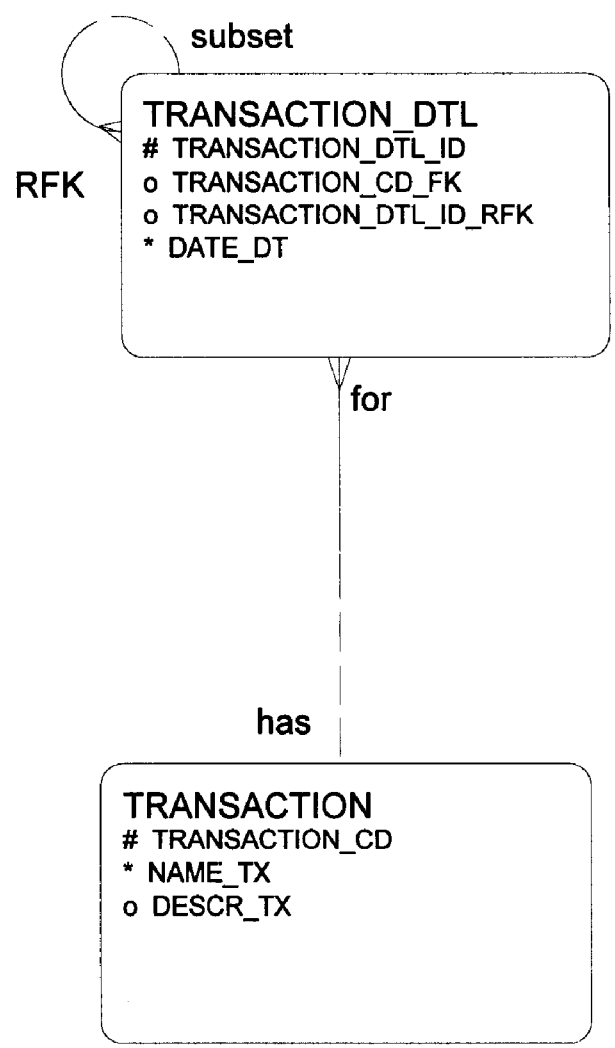

FIG. 1A is an example of a simplistic Entity-Relationship Diagram. An entity is a thing of interest. The rectangular box represents an entity, and the text string in the first line of the box is the name of the entity. The text string in the second line of the box, having a pound sign ("#"), is the primary key. The primary key is the unique identifier of data in the table. In the case of the ER diagram of FIG. 1A the name of the entity is "Transaction," and "Transaction_CD" is the primary key. The text strings in the following lines represent attributes. There are two types of attributes, namely "not null" attributes (i.e., mandatory attributes) which must have information entered when a user enters information, (indicated with an asterisk ("* ")); and nullable attributes (i.e., optional attributes) which do not need to have information entered (indicated with the letter "o"). In "Transaction," the attribute "Name_TX" is a mandatory attribute, while the attribute "Descr_TX" is optional.

| Symbol | Meaning |
| --- | --- |
| # | Primary Key |
| * | Not Null Field (i.e., mandatory) |
| o | Nullable Field (i.e., optional) |

Relationships are represented in the Figures by lines between entities. There are a few types of relationships. The specific line in the example in FIG. 1A represents a one-to-many relationship. In a one-to-many relationship, the primary key of Transaction (i.e., Transaction_CD) becomes the foreign key of the many, Transaction_Dtl. The name of the foreign key is denoted by the name of the primary key with an "FK" suffix added, i.e., Transaction_CD_FK. In this example, it is interpreted as Transactions have one or more Transaction details associated with them. The Transaction has Transaction Details associated with it; and Transaction Details are for a specific Transaction.

Each entity can be supported by a table in the database. The tables corresponding to the Transaction entity and Transaction_Dtl entity are the Transaction table in FIG. 1B and Transaction_Dtl table in FIG. 1C. (FIG. 1C is a physical schematic representation of the Entity entitled Transaction_Dtl, the various information fields thereof, the type of information contained therein, and the relationships contained therein.) The first field in the table is the attribute name. The second field is the sequence number for the attribute. The third field is a Boolean value indicating whether or not the attribute is optional. The fourth field is the physical format of the attribute; the fifth field is the length of the attribute; and the sixth field is the number of decimal places.

Some sample data for Transaction and for Transaction_Detail are shown in FIGS. 1D and 1E. The column headings in FIGS. 1D and 1E are the attributes in the Entity-Relationship Diagrams. In the Transaction table, there are two types of transactions; their names are "buy product transaction," and "sell product transaction." The Transaction_Detail table consists of three details. The first transaction detail is that a product was bought on Nov. 1, 1999; the second transaction detail is that a product was bought on Nov. 5, 1999; and the third transaction detail is that a product was sold on Nov. 1, 1999.

A preferred embodiment of the invention is described here, with reference to FIGS. 2 through 11. For pedagogical purposes only, the information structures are shown associated within the following four information structure groups: Metrix, Party, Customization and Extension.

Figure 2:
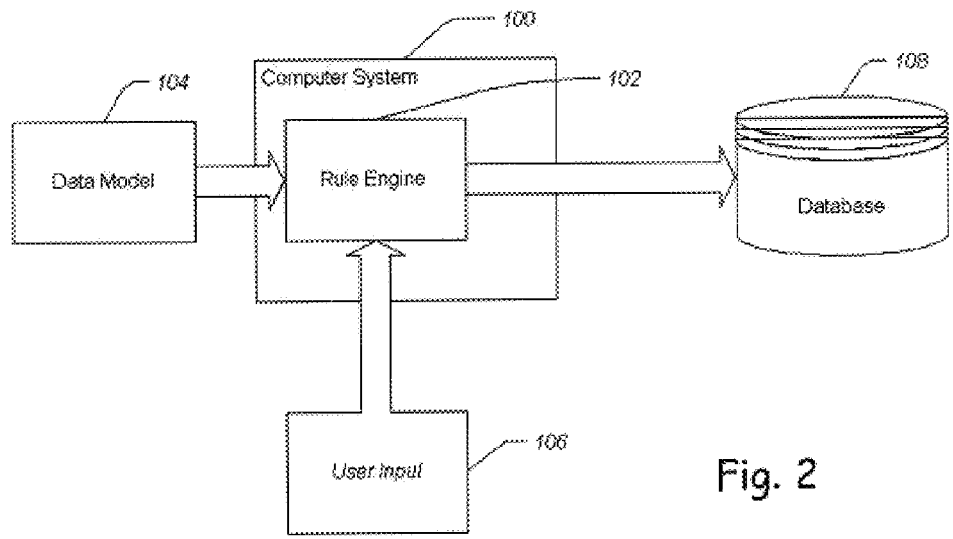
FIG. 2 is an overview of an embodiment of the present invention.

FIG. 2 is an overview of an embodiment of the present invention. In general, the system of the present invention (hereinafter "the System") may be realized in a variety of ways depending on the enabling technology available at the time of realization, and particular application requirements at hand. In the illustrative embodiment, the System is realized as a decentralized network of computers, but it could also be implemented in a centralized computing environment.

As shown in FIG. 2, a computer system 100 includes a rule engine 102 which includes a code parser and code generator for rules provided in a data model 104. In preferred embodiments of the present invention, Oracle Developer 8 from Oracle Corp. is used to build the database and rule engine.

Figure 3:
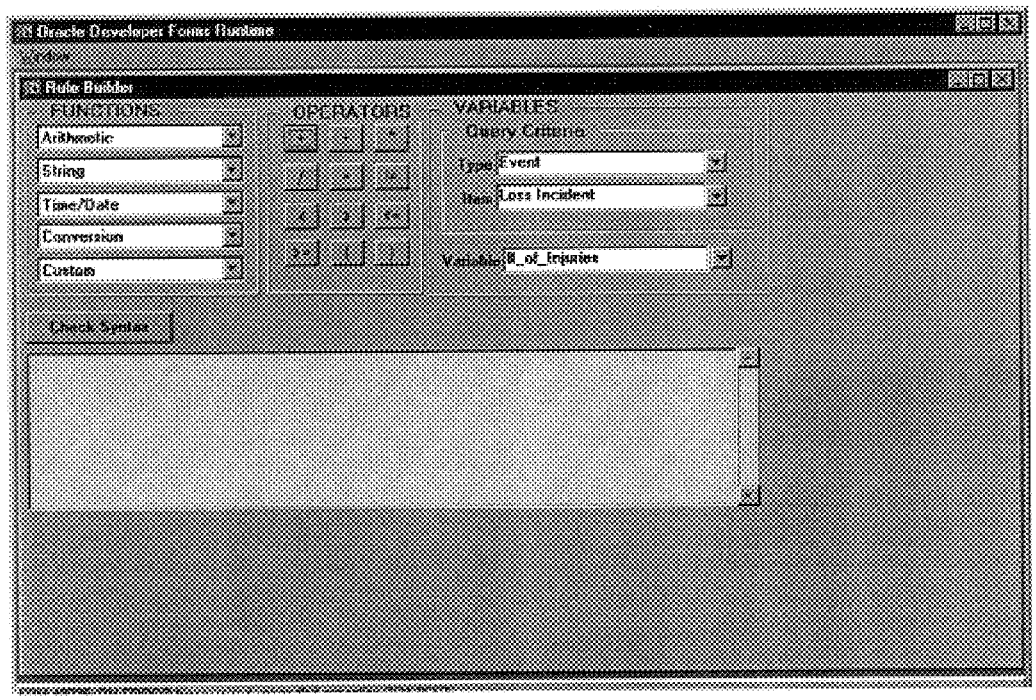
FIG. 3 is a graphical representation of a graphical display screen which is used by the tool of the present invention to enter rules and to generate rules.

FIG. 3 shows an example of the code parser and code generator for the rules in part of the System. This generalized rule engine can perform different operations on different types of variables. For example, addition, subtraction, multiplication, and division can be performed on numeric variables. Concatenate can be performed on textual data. Before date and after date can be performed on variables of type date. In addition, the generalized rule engine is sufficiently genericized so that custom functions can be programmed to do functions that do not currently exist.

The rule engine consists of both a code parser and a code generator. The code parser reads the formula that the user enters in the field, and determines whether or not it is syntactically correct. If it is, the system then passes the field to the code generator, which writes the code or procedure.

The generalized rule engine is analogous to a spreadsheet formula. Spreadsheets supports a wide variety of arithmetic operators, including basic ones such as, for example, addition, subtraction, average, and maximum, and also more complex ones such as, for example, interest rates and present value. Spreadsheets also support processing for dates.

The efficiency and effectiveness of an arithmetic rule engine can be summed up as follows: the user can enter the formula, because it is just as simple as entering a spreadsheet formula, such as, for example, Excel. The advantage is that the user does not need to write a program, which they simply would not do. The developer does not need to code the procedure, either in a relational database system or a third generation programming language, because the code generator generates the procedure. Similar to spreadsheet applications, there are a number of predefined functions in the arithmetic rule engine. However, any equation can be entered. For example, the formula to calculate the average of a set of number is:

$$\left(\sum_{i=1}^{n} x_i\right)/n$$

Because the rule engine can implement any formula, it can calculate and aggregate information in arbitrarily complex ways.

The application of the rule engine 102 using the data model 104 to a user's input 106 produces a database 108.

Figure 4:
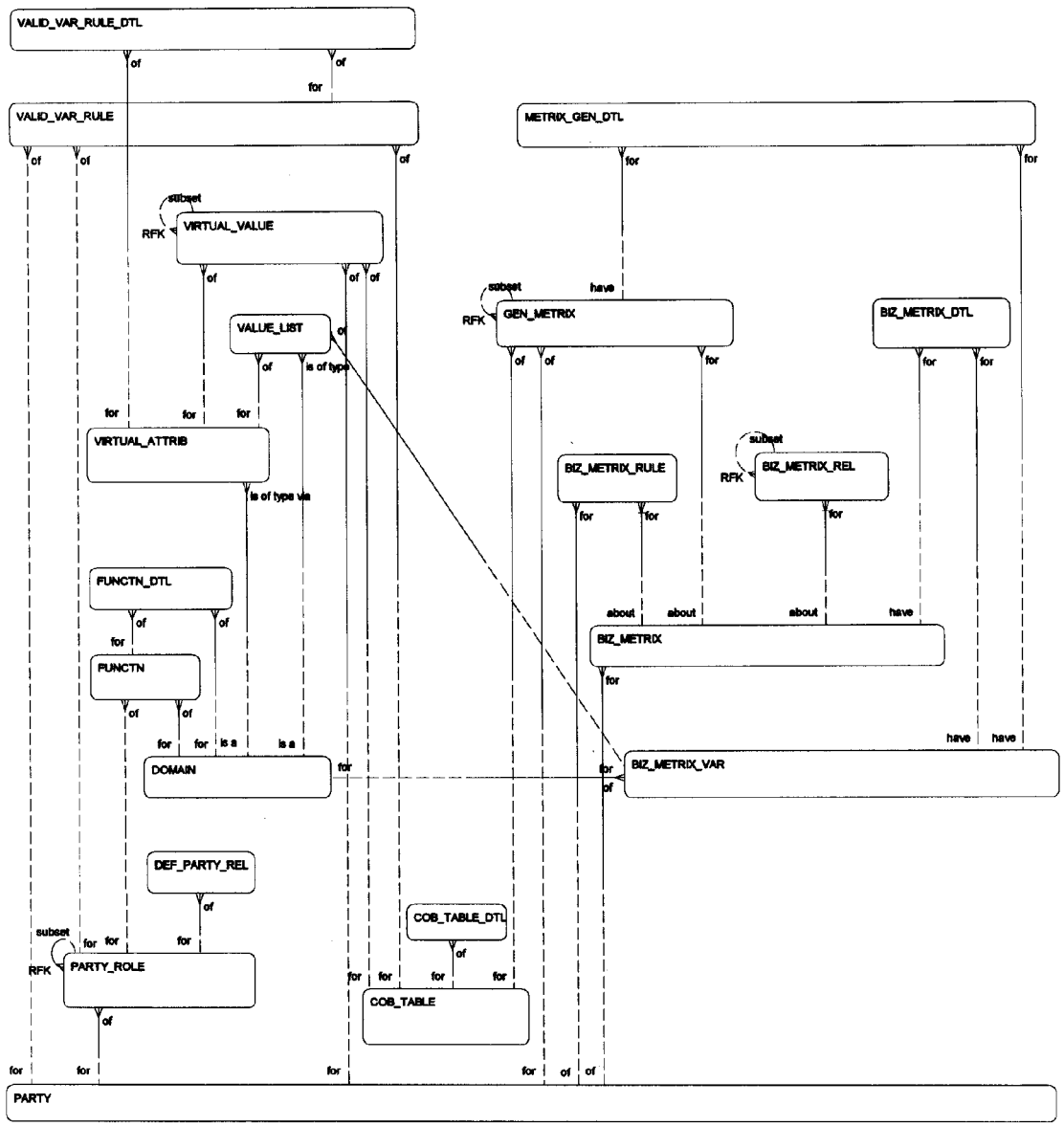
FIG. 4 is a logical, entity-relationship diagram (a schematic diagram) of the relational database design (the data model) used in the construction of an illustrative embodiment of the overall application of the present invention.
Figure 5:
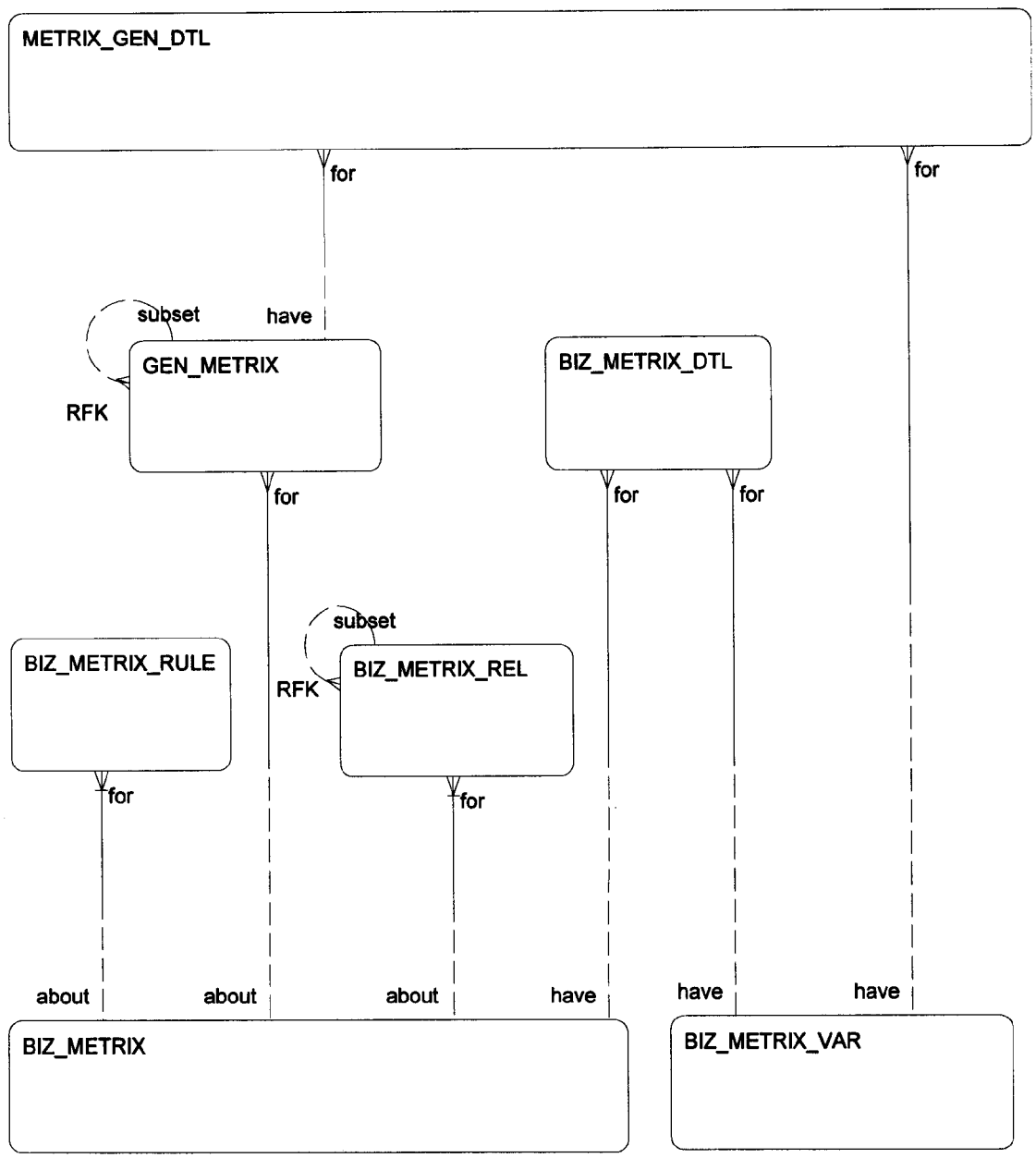
FIG. 5 is a logical, entity-relationship diagram (a schematic diagram) of a part of the relational database used in the construction of the illustrative embodiment of the present invention.

FIG. 4 is a logical, entity-relationship diagram (a schematic diagram) of the relational database design (the data model 104 in FIG. 1, for the generic database structure) used in the construction of an illustrative embodiment of the overall application of the present invention. FIG. 5 is a logical, entity-relationship diagram (a schematic diagram) of a part of the relational database used in the construction of the illustrative embodiment of the present invention. That is, FIG. 4 shows the logical database design of the entire system according to a preferred embodiment of the present invention. FIG. 4 shows the entities, and the relationships between the entities. FIG. 5 describes a functional overview of the entity Metrix, including a discussion of the entities and their relationships, and the important characteristics and advantages of the design.

A metrix is defined by first articulating the variables, that is, the data elements that will appear on the metrix, with their data type, domain, and validation rules. Define a biz metrix variable to be a valid type of information (data element) that may appear on a particular metrix, and is represented in Biz Metrix Variables (Biz_Metrix_Var). A biz metrix variable allows a user to define or specify valid variables or data elements. It can have one or more biz metrix details associated with it. The significance of the biz metrix variables is that it allows the user to define variables that will be shared by different types of documents. Variables can appear on multiple documents.

Define a metrix to be a virtual implementation of a printed or electronic or optical document or report, which is comprised of both data element values and information and subdocuments or subreports, with their associated data elements or values. A metrix is represented by the entities Gen_Metrix and Metrix_Gen_Dtl. The information contained in a metrix can be of any data type. In addition, the metrix can be of any type, such as, for example, a direct observation or a report. For example, a direct observation metrix can be any type of metric or measurement parameter, while a report metrix is a metric or measurement that is produced or calculated by a user, and printed or displayed in a report. Each metrix can have one or more submetrix associated with it. This is implemented recursively, and is represented by the partial circle in the upper left-hand corner of the entity Gen_Metrix in FIG. 5.

As used herein, the term recursion refers to database-type recursion, not programming recursion. In programming, recursion occurs when a procedure or function invokes itself. In database design, recursion occurs when an instance of a particular entity may be associated with one or more instances in the same entity. Recursion is an important feature of the design of metrix. As used herein, a recursive relationship occurs when you have an association between an object class and itself. Most commonly, recursive relationships are used for hierarchical structures, such as, for example, the organizational structure of a company. (See, e.g., Dorsey, Paul and Hudicka, Joseph. *Oracle8 Design Using UML Object Modeling*, Osborne/McGraw-Hill, 1999.)

Recursion is a powerful concept and implementation in relational database design and development, because it greatly increases the flexibility of the computer system. By using recursion, a programmer does not have to pre-specify the number of levels of association according to what the users' needs are at some point in time; rather, the user can specify as many levels of association as what are needed to meet current needs, and if it needs to be expanded in the future, the user can add the additional levels of association without modification to the database.

The actual information of either text, numbers, or dates on the metrix, i.e., on the document, are metrix gen details, which represent the values on an output format, such as, for example, a physical piece of paper or electronic or optical display. These values are stored in the entity Metrix Gen Details (Metrix_Gen_Dtl). Each metrix can have zero or more metrix gen details associated with it.

A biz metrix defines the structure of a given metrix, that is, the different structural components of the document and how those parts interact, and it is represented by the entity Biz_Metrix (FIG. 4). A biz metrix consists of a logical grouping of information. It is the definition of the type of metrix. It defines the structure of the metrix, i.e., document, that will gather information or calculate it. Each biz metrix can have zero or more metrix associated with it.

The relationship between a biz metrix and its biz submetrix, that is, between a defined document and its defined subdocuments, is specified in the biz metrix relationship (Biz_Metrix_Rel). In other words, biz metrix relationship specifies the relationship or association between biz metrix, that is, is specifies which biz metrix is a parent metrix and what child biz metrix are associated with that parent. This entity stores the information in which the user specifies which biz metrix is the subordinate metrix and which metrix is its parent or superior.

The significance of a biz metrix relationship is that it is a one-to-many recursive structure, just like metrix. By specifying biz metrix association to be a one-to-many recursive structure, it is possible to allow subdocuments to be defined once and have them be used in many types of documents. The one-to-many recursive structure can be visually represented by a tree. The one-to-many recursive structure is also flexible enough to incorporate a many-to-many recursive structure, which can be visually represented by a network.

The significance of the design of metrix and biz metrix is to separate the information from the structure of the information. This is important because the information (metrix) can be structured in a number of different ways (biz metrix). When metrix and biz metrix are modeled separately, the uniqueness of the various biz metrix or structures can be adequately captured. Metrix consists of the information printed or displayed in any media or any form, while biz metrix consists of the structure of that information. Typically, in usual system design and methodology, the precise structure of the information is built into the data structure.

Biz metrix details allow a user to specify which biz metrix variables appear on which biz metrix (Biz_Metrix_Dtl). It defines what valid information or types of information is associated with a specific type of metrix.

A biz metrix rule is the rule that associates a particular biz metrix with a particular party, and is be represented by the entity Biz Metrix Rule (Biz_Metrix_Rule). Each biz metrix can have one or more parties associated with it. This would allow, for example, a report to be about a specific company, or customer, or several companies or customers.

The separation between metrix and biz metrix, and recursion are elaborated in some detail here.

FIG. 6A is a simple example of a metrix, that of a simplified income statement for Global Corporation for January, 1999. With reference to FIG. 6A, the structure of the information (i.e., biz metrix) is as follows. The income statement for Global Corporation consists of revenues and expenses. This type of structural information is stored in the biz metrix part of the data model. Income statement is the parent biz metrix, and revenues and expenses are the child defined submetrix. Revenues, in turn, consist of different revenue streams, or financial details. In this relationship, revenue is the parent biz metrix, and financial details are the child biz metrix. Expenses consist of different expense categories. In this relationship, expense is the parent biz metrix, and financial details are the child biz metrix.

FIG. 6B is the visual representation of the report when viewed hierarchically. Alternatively, the hierarchical nature of biz metrix can be visualized in a tree-like structure as follows:

1 Income Statement
  2 Revenues
    3 Software
    4 Hardware
    5 Services
  6 Expenses
    7 Salary
    8 Rent This hierarchical structure is implemented recursively in the present invention. The significance of these seven entities is that they are sufficient to capture the structure of any type of document and represent any report or document.

A recursive metrix application is a convenient and efficient way to store knowledge. Hierarchies exist in both the natural surroundings as well as in man-made constructs, and hierarchical information can be represented easily in a recursive structure. For example, take the organizational structure of a business firm. A typical firm is composed of divisions, divisions are composed of departments, and departments are composed of teams. A potential database design may consist of the following four entities: firm, divisions, departments, and teams. In a recursive design, there would be two recursive entities: a party entity, and a party role entity. The recursive structure is generic because any party can be added, and, more importantly, any type of party can be added at any level.

An intuitive way to think about any recursive application is that a recursive structure is a fractal. That is, the properties of the entity hold for any aggregate/summary level or any detailed level. A fractal is a geometric visual pattern or representation which repeats itself, either aggregating up to an overview, or drilling down into finer and smaller patterns. These patterns are repeated at every level. Parties, such as, for example, organization units, can be represented by fractals because the characteristics, or metrix, of an organization unit are the same characteristics of a different organization unit at a higher or lower level. For example, it is useful to know what the revenues and expenses are of each team, department, division, and overall firm. Consequently, the recursive metric application can be visualized as a fractal.

As a simpler analogy, recursive structures are like a set of maps. Take a map of the United States, for example. One can drill down to states, then counties, then cities, and eventually to streets and roads. Similarly, one can aggregate up to continents, the planet, the solar system, the galaxy, and then the universe.An advantage of a recursive metrix application is that it can be scaled up or down an arbitrary number of levels, regardless of the level at which it was implemented.

For example, if a measurement system was implemented at the level of the business line, it would provide useful information to the CEO. However, after being implemented for the business lines, a single business line could take it down one level and have all their direct reports enter information into it. The recursive metrix structure can be scaled up or down an arbitrary number of levels.

Another way to think about recursive generic structures is that they allow the user to define things in terms of themselves. A large organization unit, such as a firm, consists of small organization units. A global expense amount is comprised of major expenses, which are comprised of detailed expenses. Defining things in terms of themselves allows for a very great advantage in terms of efficiency. Inventory, for example, can be defined very efficiently. A component of a car engine, such as, for example, a carburetor, is itself made up of components. Rather than exhaustively listing all the small to large types of components, and encoding each of these as an entity, the system designer just has one recursive entity called component.

Figure 7:
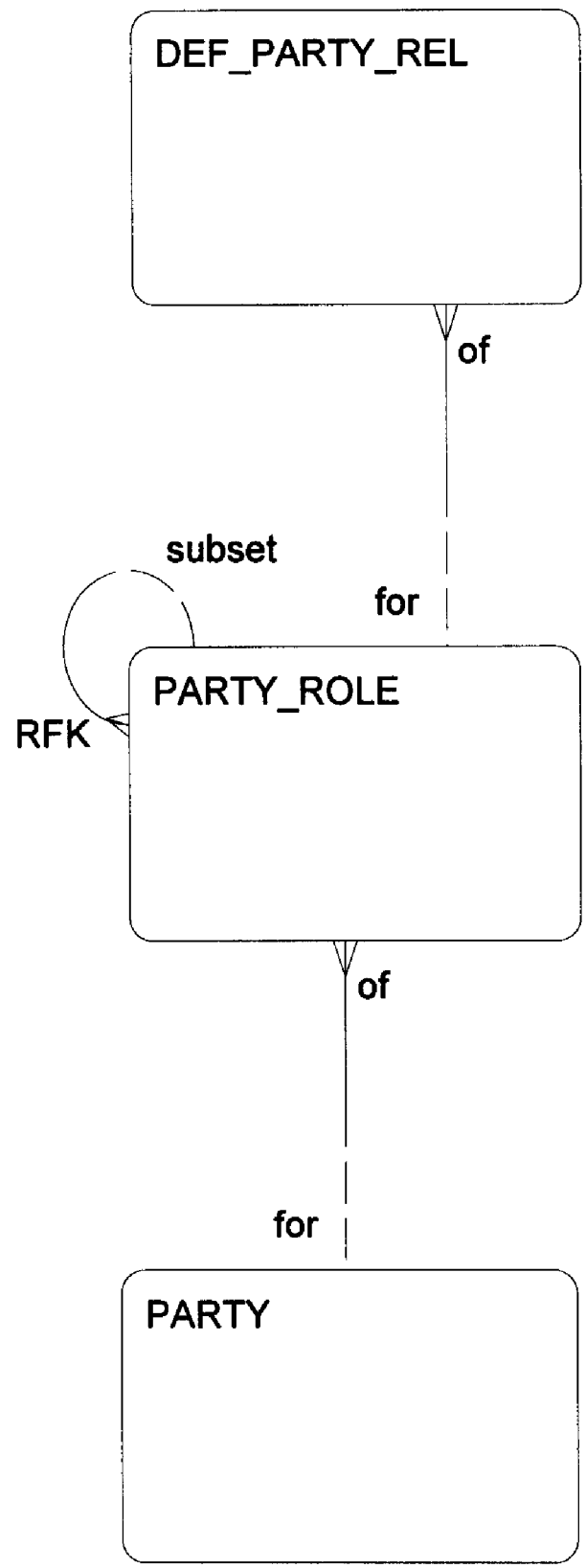
FIG. 7 is a logical, entity-relationship diagram (a schematic diagram) of the Party part of the relational database used in the construction of an illustrative embodiment of the present invention.

FIG. 7 is a logical, entity-relationship diagram (a schematic diagram) of the Party part of the relational database used in the construction of an illustrative embodiment of the present invention. FIG. 7 provides a functional overview of Party, including a discussion of the entities and their relationships, and the important characteristics and advantages of the design. A party is a particular individual, collection of individuals, organization unit, or collection of organization units, and is represented by the entity Party. For example, a party could be a particular person, a group, a team, a department, a division, an organization unit, a company, a holding company, a supplier, a customer, a government agency, and so on.

The associations between parties are specified in party role (Party_Role). Party role defines the role that each party plays by having the user specify the type of the party, which party is the subordinate party, and which party is its parent or superordinate party, for a specific party relationship type. A party type is a type of party, such as, for example, department, profit center, company or holding company. A party relationship type is the type of relationship that exists between two parties, such as, for example, the reporting relationship. A specific person can report to a specific manager, or a specific department can report to a specific division. Consequently, the party and party role entities can be used to represent the organization structure or organization hierarchy of a company. A key feature of this design is that the relationships, such as, for example, who reports to whom, are stored in the database as data. Party role stores every party of every type and the relationships between the parties.

Another significant feature of party role is that the entity has a recursive relationship. Therefore, it is able to incorporate network relationships as well as strict tree hierarchical relationships. Even more importantly, the recursive relationship allows the user to represent context-dependent relationships among parties.

Let def party relationship be the specific relationship or association between party types, in contrast to party role, which stored the specific relationship or association between parties. Defined party relationship allows the user to define the rules of which valid party types are associated with a particular relationship (such as, for example, departments report to divisions). The ability to store these rules in def party relationship is a key feature of this design, and greatly enhances the flexibility of the system.

The significance of these three entities is that they are sufficient to capture and represent any party and types of parties, as well as the types of relationships between parties and types of parties, at a high level of abstraction, with a corresponding depth of flexibility and increase in design, development, and implementation efficiency. Take party, for example. Typically, following traditional database design and methods, there would be a different entity for each type of party. For example, there would be an entity for organization units, one for suppliers, another for customers, and yet another for personnel. Reducing four entities (organization unit, supplier, customer, personnel) to one (party) simultaneously decreases work (by about three-fourths) and increases flexibility. Flexibility is increased because not only could any specific organization unit, supplier, customer, or personnel be added easily by users, but any type of party, such as, for example, government agencies, that becomes important in the future, can be added easily by the users. This is not true of a traditional entity-relationship design, in which a new type of party would need to be added by a database designer and developer by building another entity. By capturing the types of parties and modeling it as an entity, the users can define new parties and types of parties as they arise during the normal course of business.

Figure 8:
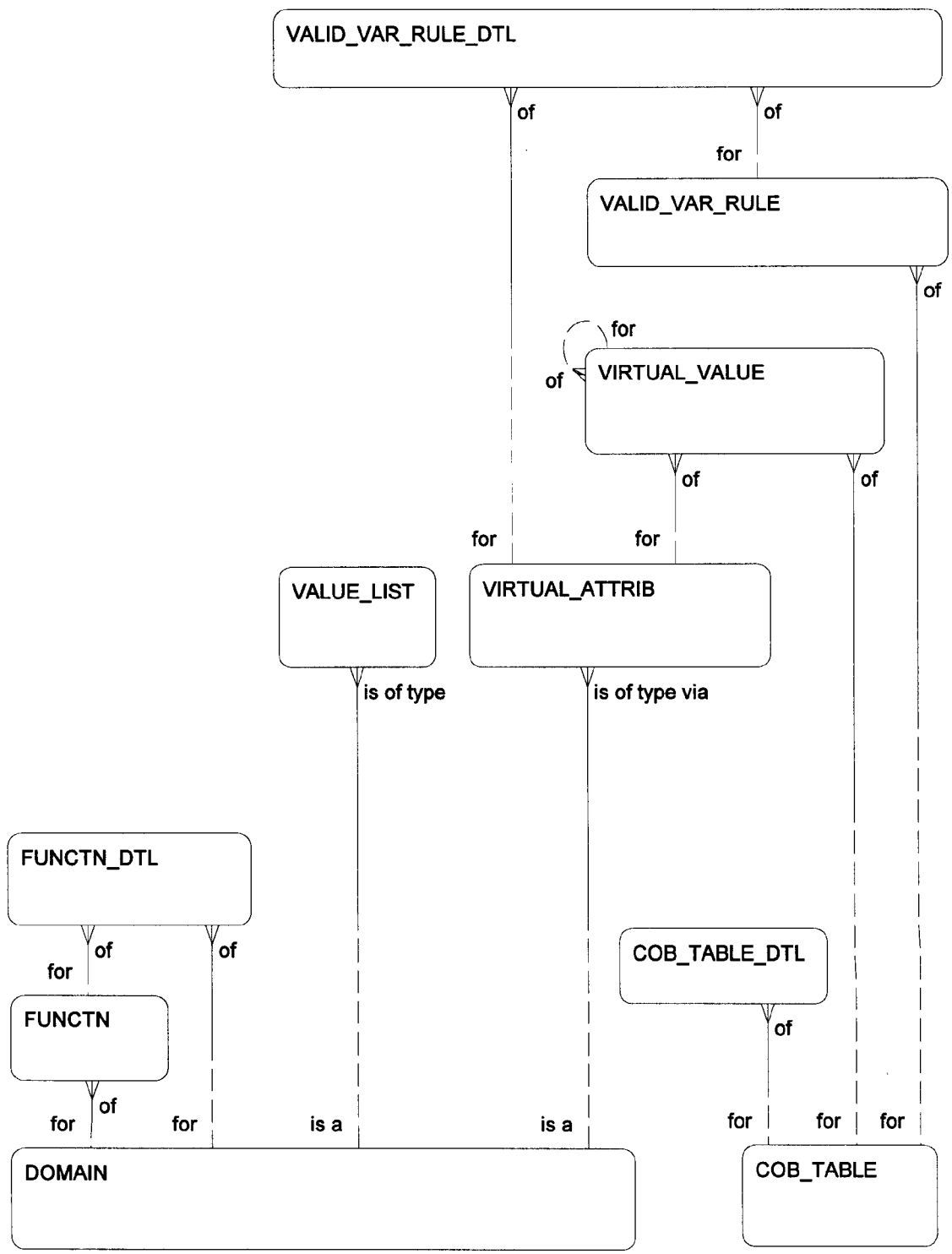
FIG. 8 is a logical, entity-relationship diagram (a schematic diagram) of the Customization and Extension part of the relational database used in the construction of an illustrative embodiment of the present invention.

FIG. 8 is a logical, entity-relationship diagram (a schematic diagram) of the Customization and Extension part of the relational database used in the construction of an illustrative embodiment of the present invention. FIG. 8 provides a functional overview of Customization and Extension, including a discussion of the entities and their relationships, and the important characteristics and advantages of the design.

The purpose of the customization and extension module allows the user to track, analyze, and report on different information than what was previously envisioned by the database designer, application developer, or report writer. Let a domain be a particular set of related items. For example, one domain could be color, while another domain could be gender. Value list consists of the list of valid values for a particular domain. For example, the color value list could consist of red, green, blue, yellow, black and white. The gender value list could consist of male and female. Each domain can have one or more valid values in the value list. The significance of these two tables is that a user can add domains and value lists to the database, without requiring programmer assistance. Typically, only programmers add this type of information.

The Complex OBject (COB) Table consists of the list of all the virtual tables in the database. Each row in the COB Table no longer represents a physical table in the database; rather, each row represents a logical table. The COB_Table_Dtl consists of the list of all tables that have a high level of interaction with other tables in the database. It can be thought of as an index or a pointer to the highly referenced tables in the database. COB_Table_Dtl is an important table, because for every table that is named in the COB_Table_Dtl, that table can be linked to any other table in the database, consequently providing a very high level of flexibility in the entire database. Most databases do not have this level of flexibility.

Virtual Attrib consists of the virtual attributes or virtual columns in the database. Each virtual attribute can have one or more domains associated with it. Virtual Value consists of the values of the virtual attributes or columns from Virtual Attrib. For example, one of the values of an attribute could be the name of the attribute. The significance of having the values of the attributes in a different table than the attributes themselves is that it allows for multiple values to be assigned to the same underlying variable. One potential application is that Virtual Value provides multilingual support, where there are different words in different languages for the same thing, that is, the same virtual attribute. Virtual Value is recursive, allowing a user to have an unlimited hierarchy of attributes, including multilingual support. Because Virtual Value is linked to the COB Table, it can be associated with any of the tables in the database.

Valid Variable Rule specifies which party is associated with which complex object at a particular point in time. Valid Variable Rule can be thought of as specifying a certain context. Valid Variable Rule Dtl specifies which parties have which virtual values associated with them. In other words, Valid Variable Rule Dtl stores the information, or rules, that determine what attributes or variables are used in a specific context. These two tables, together with Virtual Attrib and Virtual Value, provide a very high level of flexibility to the database, because without programmer effort or intervention, the user can add his/her attributes and values, as data, to the tables in the database.

A functn is a mathematical function. Each domain can be associated with many functions. Functn dtl consists of the details associated with a function. Each function can have one or more function details associated with it.

Specification Of The Information Structures Comprising The Relational Database Of The Present Invention Again, for the purposes of enhancing understanding only, the information structures are shown sequentially associated within the following four information structure groups: Metrix, Party, Customization and Extension, and Access. FIGS. 9A–9T are physical schematic representations of various Entities, the various respective information fields thereof, the type of information contained therein, and the relationships contained therein More specifically,

- FIG. 9-A is a physical schematic representation of the Entity entitled Biz_Metrix, the various information fields thereof, the type of information contained therein, and the relationships contained therein;
- FIG. 9-B is a physical schematic representation of the Entity entitled Biz Metrix Rel, the various information fields thereof, the type of information contained therein, and the relationships contained therein;
- FIG. 9-C is a physical schematic representation of the Entity entitled Biz_Metrix_Rule, the various information fields thereof, the type of information contained therein, and the relationships contained therein;
- FIG. 9-D is a physical schematic representation of the Entity entitled Biz_Metrix_Var, the various information fields thereof, the type of information contained therein, and the relationships contained therein;
- FIG. 9-E is a physical schematic representation of the Entity entitled Biz_Metrix_Dtl, the various information fields thereof, the type of information contained therein, and the relationships contained therein;
- FIG. 9-F is a physical schematic representation of the Entity entitled Gen_Metrix, the various information fields thereof, the type of information contained therein, and the relationships contained therein;
- FIG. 9-G is a physical schematic representation of the Entity entitled Metrix_Gen_Dtl, the various information fields thereof, the type of information contained therein, and the relationships contained therein;
- FIG. 9-H is a physical schematic representation of the Entity entitled Party, the various information fields thereof, the type of information contained therein, and the relationships contained therein;

FIG. 9-I is a physical schematic representation of the Entity entitled Party-Role, the various information fields thereof, the type of information contained therein, and the relationships contained therein;

FIG. 9-J is a physical schematic representation of the Entity entitled Def_Party_Rel, the various information fields thereof, the type of information contained therein, and the relationships contained therein;

FIG. 9-K is a physical schematic representation of the Entity entitled Domain, the various information fields thereof, the type of information contained therein, and the relationships contained therein;

FIG. 9-L is a physical schematic representation of the Entity entitled Virtual_Attrib, the various information fields thereof, the type of information contained therein, and the relationships contained therein;

FIG. 9-M is a physical schematic representation of the Entity entitled Value_List, the various information fields thereof, the type of information contained therein, and the relationships contained therein;

FIG. 9-N is a physical schematic representation of the Entity entitled COB_Table, the various information fields thereof, the type of information contained therein, and the relationships contained therein;

FIG. 9-O is a physical schematic representation of the Entity entitled COB_Table_Dtl, the various information fields thereof, the type of information contained therein, and the relationships contained therein;

FIG. 9-P is a physical schematic representation of the Entity entitled Virtual_Value, the various information fields thereof, the type of information contained therein, and the relationships contained therein;

FIG. 9-Q is a physical schematic representation of the Entity entitled Valid_Var-Rule, the various information fields thereof, the type of information contained therein, and the relationships contained therein;

FIG. 9-R is a physical schematic representation of the Entity entitled Valid_Var_Rule_Dtl, the various information fields thereof, the type of information contained therein, and the relationships contained therein;

FIG. 9-S is a physical schematic representation of the Entity entitled Functn, the various information fields thereof, the type of information contained therein, and the relationships contained therein; and FIG. 9-T is a physical schematic representation of the Entity entitled Functn_Dtl, the various information fields thereof, the type of information contained therein, and the relationships contained therein.

With reference to FIG. 9-A, a user defines the structure of the metric (Biz_Metric) by specifying the following attributes in the relational database table. First, each biz metric needs to have a unique identifier. This is done by specifying Biz_Metric_CD as the primary key. The system automatically generates the value for this field, and does so for all primary keys throughout the entire The System. Second, the user specifies the type of metric in the attribute Z_Metric_CD. There are at least three valid types of metric, including direct observation, report, or a combination of direct observation and report. Third, the user has the option of specifying the frequency with which the biz metric is generated or published, such as, for example, daily, monthly, yearly, etc. in the attribute Z_Period_CD. Fourth, the user specifies the relationship between Party and Biz_Metric, by using Party_ID as a foreign key from Party, in the attribute Party_ID_FK. Fifth, the user specifies the name of the biz metric in the attribute Name_TX. Sixth, the user can specify the description of the biz metric in the attribute Descr_TX.

With reference to FIG. 9-B, the user then defines the relationships among the Biz_Metric components, by specifying the following attributes in the relational database table, Biz Metric Rel. First, each Biz_Metric_Rel needs to have a unique identifier. This is done by specifying Biz_Metric_Rel_ID as the primary key. The user then specifies the child metric type, which can also be referred to as the subordinate metric type. This is done by using Biz_Metric_CD_FK as a foreign key from Biz_Metric. The relationship that brings this foreign key in is half dotted and half solid, indicating that if there is a Biz_Metric_Rel, there must be an associated Biz metric. The user can then specify the parent of that metric type (if a parent exists), which can also be referred to as the superordinate metric type. This is done by using the recursive foreign key from the Biz_Metric_Rel entity, Biz_Metric_Rel_ID_RFK. The recursive relationship that brings this foreign key in is all dotted, indicating that for at least one Biz_Metric, there is no parent to it (because it itself is the root or parent instance). The user can then specify the minimum and maximum number of times the biz metric component will appear in an instantiation of the parent biz metric, in the attributes Min_Times_NR and Max_Times_NR, respectively.

With reference to FIG. 9-C, the user defines the subject of the metric, Biz_Metric_Rule, by specifying the following attributes in the relational database table. First, each Biz_Metric_Rule needs to have a unique identifier. This is done by specifying Biz_Metric_Rule_ID as the primary key. The user then specifies which biz metric is relevant, by using the foreign key, Biz_Metric_CD_FK. A biz metric rule indicates which objects the instantiations of the biz metric may be attached to. The user then associates a particular party with the biz metric subject, by using Party_ID_FK as a foreign key from Party. The user then has the option of specifying a particular party role with the biz metric subject, by using Party_Role_CD_FK as a foreign key from Party_Role.

With reference to FIG. 9-D, the user defines the metrix variables, Biz_Metric_Var, by specifying the following attributes in the relational database table. A biz metric variable is the name of a variable or parameter that appears on the metrix. First, each Biz_Metric_Var needs to have a unique identifier. This is done by specifying Biz_Metrix-Var_ID as the primary key. The user then needs to specify which domain the biz metric variable is associated with, by using Domain_CD_FK as a foreign key from Domain. The user then needs to specify the name of the biz metric variable in the attribute Name_TX. The user then can specify a description of the variable, in the attribute Descr_TX. Finally, the user can then specify the SQL expression, in the attribute SQL_TX, that can be used to select the values for the variable.

With reference to FIG. 9-E, the user defines the biz metric details, Biz_Metric_Dtl, by specifying the following attributes in the relational database table. First, each Biz_Metric_Dtl needs to have a unique identifier. This is done by specifying Biz_Metric_Dtl_ID as the primary key. The user then specifies the biz metric associated with the details, by using Biz_Metric_CD_FK as one foreign key from Biz_Metric. The user then specifies the relationship of the defined metric variables associated with the details, by using Biz_Metrix_Var_ID_FK as a foreign key from Biz_Metrix_Var. The user then specifies the valid type of metrix detail (such as, for example, direct observation, i.e., raw data point, or calculated number) in the attribute Z_Metrix_CD. The user can then define the label of the biz metrix detail in the attribute Label_TX. Next, the user can then define the rule to support complex data validation. If it is a value which is to be manually entered, it is a Rule_Valid_TX, while Rule_Gener_TX would be a similar function that would return the actual value of the variable when a metrix of that type is instantiated. The user then has the option to specify the default value in the attribute Deflt_TX. Finally, the user can define whether or not this specific biz metrix detail is required in the attribute Reqd_YN.

With reference to FIG. 9-F, the user then defines the metrix, Gen_Metrix, by specifying the following attributes in the relational database table. First, each metrix needs to have a unique identifier. This is done by specifying Gen_Metrix_ID as the primary key. The user can then specify the parent of the gen_metrix (if a parent exists), by using the recursive foreign key Gen_Metrix_ID_RFK from Gen_Metrix. The user then specifies the biz metrix associated with metrix, by using Biz_Metrix_CD_FK as the foreign key from Biz_Metrix. The user then specifies the party that is associated with the Gen_Metrix, using Party_ID_FK as a foreign key from Party. The user can then specify the relevant COB_Table_Code_FK, and COB_Link_ID or COB_Link_CD. These fields are the links that allow a metrix to be associated with any row with any table in the database. The user specifies the valid frequency with which the metrix was generated or published, such as, for example, weekly or yearly, in the attribute Z_Period_CD. The user then specifies a valid status of the metrix, such as, for example, open, pending or closed, in Z_Sts_CD. The user can then specify the creation date of the document in Doc_DT. The user can also specify the last date the metrix was calculated in Calc_DT. The user can then specify the start date of the observation, in Obsrv_Start_DT, that is appropriate when there is a range of dates. Similarly, the user can specify the end date of the range of observations, in Obsrv_End_DT. Finally, the user can then specify Descr_TX, which is a text description. Once the user instantiates the biz metrix as a gen_metrix, the system knows enough to populate some, if not all, of the gen_metrix. Submetrix and metrix details are automatically generated when the gen_metrix is instantiated based upon the structural rules in the biz metrix and associated tables.

With reference to FIG. 9-G, the user defines the last of the Metrix information structures, Metrix_Gen_Dtl, by specifying the following attributes in the relational database table. First, each Metrix_Gen_Dtl needs to have a unique identifier. This is done by specifying Metrix_Gen_Dtl_ID as the primary key. The user then specifies the metrix associated with Metrix_Gen_Dtl, by using Gen_Metrix_ID_FK as the foreign key from Gen_Metrix. The user then specifies the biz metrix variables associated with Metrix Dtl, by using Biz_Metrix_Var_ID_FK as the foreign key from Biz_Metrix_Var. The user can then specify the valid type of metrix detail, such as, for example, direct observation (raw data point) or calculated number, in Z_Metrix_Dtl_CD. The user then enters the information that they want, in one of three fields: Value_TX for text data, Value_NR for numeric data, and Value_DT for date data. The user can then enter whether or not the information is required, in Req_YN. Finally, the user has the option to enter a label for the metrix detail, in the attribute Label_TX.

With reference to FIG. 9-H, the user defines the party, Party, by specifying the following attributes in the relational database table. First, each Party needs to have a unique identifier. This is done by specifying Party_ID as the primary key. The user specifies the name of the party, if the party is anything other than a person, in the attribute Party_Name_TX. If the party is a person, the user enters the person's first name, in the attribute First_Name_TX, and last name, in the attribute Last_Name_TX. Next, the user can then specify whether or not the party is a person in the Boolean attribute, Person_YN. The user then needs to specify the start date of the party, in the attribute Start_DT, and then has the option of specifying an end date of that party, in the attribute End_DT.

With reference to FIG. 9-I, the user then defines the associations between parties, Party_Role, by specifying the following attributes in the relational database table. First, each Party_Role needs to have a unique identifier. This is done by specifying the attribute Party_Role_ID to be the primary key. The user specifies the parent party, if one exists, which can also be referred to as the superordinate party. This is done by using Party_Role_ID as a foreign key from the recursive relationship, resulting in Party_Role_ID_RFK. The user then specifies the particular party, by using Party_ID_FK as a foreign key from Party. Next, the user specifies the party type in the attribute Z_Party_CD. A valid type of party, for example, could be department, profit center, company, or holding company. Next the user specifies the type of party relationship, in the attribute Z_Rel_CD. For example, there are at least two types of valid party relationships: the reporting relationship and the auditing relationship. In the reporting relationship, an employee reports to a manager or a subdivision reports to a division. In an auditing relationship, the audit department audits all of the other departments. Next, the user specifies the start date of when the party association began, in the attribute Start_DT. Finally, the user can specify the end date of when the particular parent child structure for a given association terminated, in the attribute End_DT.

With reference to FIG. 9-J, the user defines the last of the Party information structures by defining the rules that govern the specific relationships or associations among the party types. First, each defined party relationship, or rule, needs to have a unique identifier. This is done by specifying Def_Party_Rel_ID to be the primary key. The user specifies which context, or party role, is relevant, by using Party_Role_ID_FK as a foreign key from Party_Role. Next, the user specifies the object or party type that the rule is about, in Z_Party_CD_Child. The user then has the option of specifying the parent party type, if a parent exists, in the attribute Z_Party_CD. The user then specifies the type of the relationship between the two party types, in Z_Rel_CD. The user then has the option of specifying whether or not the child party type is a person, in the attribute Person_YN. The user then specifies the date that the defined party relationship began, in the attribute Start_DT. The user then has the option of specifying when the termination of the defined party relationship occurs, in the attribute End_DT.

The significance of having start dates and end dates on party, party role, and defined party relationship is that internal and external reorganizations, mergers, or acquisitions are easily handled. Organizations and their structures change over time. By having timestamps associated with them, it is possible to track the organizations, their structures, and both organizational changes and structural changes over time. This information may be particularly valuable if an organization wants to view financial positions or other information before and/or after organizational changes occur.

With reference to FIG. 9-K, the user defines the first of the customization and extension information structures, Domain, by specifying the following attributes in a relational database table. First, each domain needs to have a unique identifier. This is done by specifying Domain_CD as the primary key. The system automatically generates the value for this field, as it does for all primary keys throughout the entire system. Second, the user specifies the type of data in the attribute Z_Data_CD. There are at least three types of data, including numeric, text, and date. Third, the user specifies the name of the domain in the attribute Name_TX. The user then has the option of specifying a description in the attribute, Descr_TX. The user can then enter a default value for the domain, in Default_TX. Next, the user can enter a SQL statement, in SQL_TX. The user has the option of specifying a valid rule, in Valid_Rule_TX. Valid_Rule_TX is a function or expression that can return a True or False value, which can validate that the user-entered information is correct. The user also has the option of specifying the minimum and maximum value associated with the domain, in Min_NR and Max_NR, respectively. The user can enter the number of decimal places for a numeric data type, that is, precision, in Precis_NR. Finally, the user can enter the number of characters of the variable in Length_NR.

With reference to FIG. 9-L, the user next defines the virtual attributes, Virtual Attrib, by specifying the following attributes in a relational database table. First, each Virtual Attribute needs to have a unique identifier. This is done by specifying Virtual_Attrib_CD as the primary key. Name_TX is not an attribute in this table, because the name of the virtual attribute is stored as data in Virtual Value. The user specifies the domain associated with the virtual attribute, by using Domain_CD_FK as the foreign key from Domain. The user has the option of specifying the data type of the information in the attribute Data_Type_CD. The user has the option of specifying a rule in the attribute Rule_TX.

With reference to FIG. 9-M, the user then defines the possible value list for each domain, by specifying the following attributes in a relational database table, Value_List. Value_List_ID is specified as the primary key. The user specifies which virtual attribute is associated with the value by specifying Virtual_Attrib_CD_FK as a foreign key from Virtual_Attrib. The user specifies the relevant domain, by using Domain_CD_FK as the foreign key from Domain. The user specifies which biz metrix variable is associated with the value list by using Biz_Metrix_Var_CD_FK from Biz_Metrix_Var. The user can then specify the value in one of the following three attributes: Value_NR if the value has a numeric data type, Value_TX if the value is a text data type, and Value_DT if the value is a date data type.

With reference to FIG. 9-N, the user then defines the COB Table, by specifying the following attributes in a relational database table. First, each COB_Table_CD needs to have a unique identifier. This is done by specifying COB_Table_CD as the primary key. The user specifies the name of the virtual or logical table in the attribute Name_TX. The user then has the option of specifying a unique identifier in the attribute COB_Link_ID_TX. The user has the option of specifying an SQL query in the following three attributes, the select clause, from clause, and where clause, in SQL_Select_TX, SQL_From_TX, and SQL_Where_TX, respectively. The user also has the option of specifying a description, in the attribute Descr_TX. Finally, the user can specify the owner, in the attribute Owner_TX.

With reference to FIG. 9-0, the user then defines the COB Table Dtl, by specifying the code of the highly referenced or interactive table in the database, that is associated with the virtual table given in COB Table.

With reference to FIG. 9-P, the user next defines the values of the virtual attributes, in a relational database table called Virtual_Value. First, each Virtual_Value needs to have a unique identifier. This is done by specifying Virtual_Value_ID as the primary key. The user can group the virtual values hierarchically, by specifying the parent of that Virtual_Value_ID (if a parent exists), by using the recursive foreign key, Virtual_Value_ID_RFK. The user specifies which Virtual Attribute is to be associated with the Virtual Value, by using Virtual_Attrib_CD_FK as a foreign key from Virtual_Attrib. The user then specifies which COB Table is to be associated with the virtual value, by using COB_Table_CD_FK as a foreign key from COB_Table. The user then has the option of specifying either the COB_Link_ID or the COB_Link_CD, in the attributes COB_Link_ID or COB_Link_CD, respectively, to obtain a particular row from the COB_Table. Finally, the user can specify the value in one of the following three attributes: Value_NR if the value has a numeric data type, Value_TX if the value is a text data type, and Value_DT if the value is a date data type. The name of the virtual attribute, for example, would be stored in Value_TX.

With reference to FIG. 9-Q, the user defines the rules that associate each party's interaction with the complex objects, in a relational database table called Valid_Var_Rule. First, each rule needs to have a unique identifier. This is done by specifying Valid_Var_Rule_ID as the primary key. The user can then specifies which party or which party role is associated with a specific complex object, by using Party_ID_FK as a foreign key from Party or Party_Role_CD_FK as a foreign key from Party_Role. The user then specifies which complex object is associated with that party, by using COB_Table_CD_FK as a foreign key from COB_Table. The user then has the option of specifying either the COB_Link_ID or the COB_Link_CD, in the attributes COB_Link_ID or COB_Link_CD, respectively, to obtain a particular row from the COB_Table. The user then needs to specify when this association between party and complex object started, in the attribute Start_DT. Finally, the user has the option of specifying a end date for this association, in the attribute End_DT.

With reference to FIG. 9-R, the user next defines the rules' details, by specifying the following attributes in a relational database table, Valid_Var_Rule_Dtl. First, each rule detail needs to have a unique identifier. This is done by specifying Valid_Var_Rule_Dtl_ID as the primary key. The user specifies which rule is relevant, by using Valid_Var_Rule_ID_FK as the foreign key from Valid_Var_Rule. The user then specifies the virtual attribute associated with the rule detail, by using Virtual_Attrib_CD_FK as the foreign key from Virtual_Attrib. Finally, the user has the option of specifying the minimum and maximum number of times that the rule detail can appear, in the attributes Min_Times_NR and Max_Times_NR, respectively.

With reference to FIG. 9-S, the user then defines the functions associated with each domain, by specifying the following attributes in a relational database table, Functn. Functn_CD is specified as the primary key. The user specifies the relevant domain, by using Domain_CD_FK, as the foreign key from Domain. The user then has the option of specifying a particular party role with a specific function, by using Party_Role_ID_FK as a foreign key from Party_Role. The user then specifies the name of the function in the attribute Name_TX. The user then has the option of specifying the syntax of the function, in the attribute Syntx_TX. The user then has the option of specifying a description of the function, in the attribute Descr_TX.

With reference to FIG. 9-T, the user defines the last of the customization and extension information structures, Functn_Dtl, by specifying the following attributes in a relational database table. Functn Dtl_CD is specified as the primary key. The user specifies the relevant function, by using Functn_CD_FK as the foreign key from Functn. The user then specifies which domain is associated with the function, by using Domain_CD_FK as the foreign key from Domain. The user then specifies the name of the function in the attribute Name_TX. The user then has the option of specifying whether or not the function detail can repeat, in the attribute May_Repeat_YN. The user can then specify whether or not the function detail is required, in the attribute Reqd_YN. The user then has the option of specifying a default value for the function detail, in the attribute Default_Val_TX. Finally, the user can specify a description of the function detail in Descr_TX.

Using The Present Invention

The following example illustrates how this process and computer system can be used in practice, using sample data. FIGS. 10-A to 10-T are examples of sample data in various of the entities and tables. More specifically, FIG. 10-A is an example of sample data in the Entity and Table entitled Biz_Metrix;

FIG. 10-B is an example of sample data in the Entity and Table entitled Biz_Metrix_Rel;

FIG. 10-C is an example of sample data in the Entity and Table entitled Biz_Metrix_Rule;

FIG. 10-D is an example of sample data in the Entity and Table entitled Biz_Metrix_Var;

FIG. 10-E is an example of sample data in the Entity and Table entitled Biz_Metrix_Dtl;

FIG. 10-F is an example of sample data in the Entity and Table entitled Gen_Metrix;

FIG. 10-G is an example of sample data in the Entity and Table entitled Metrix_Gen_Dtl;

FIG. 10-H is an example of sample data in the Entity and Table entitled Party;

FIG. 10-I is an example of sample data in the Entity and Table entitled Party_Role;

FIG. 10-J is an example of sample data in the Entity and Table entitled Def_Party_Rel;

FIG. 10-K is an example of sample data in the Entity and Table entitled Domain;

FIG. 10-L is an example of sample data in the Entity and Table entitled Virtual_Attrib;

FIG. 10-M is an example of sample data in the Entity and Table entitled Value_List;

FIG. 10-N is an example of sample data in the Entity and Table entitled COB_Table;

FIG. 10-0 is an example of sample data in the Entity and Table entitled COB_Table_Dtl;

FIG. 10-P is an example of sample data in the Entity and Table entitled Virtual_Value;

FIG. 10-Q is an example of sample data in the Entity and Table entitled Valid_Var_Rule;

FIG. 10-R is an example of sample data in the Entity and Table entitled Valid_Var_Rule_Dtl;

FIG. 10-S is an example of sample data in the Entity and Table entitled Functn; and FIG. 10-T is an example of sample data in the Entity and Table entitled Functn_Dtl.

FIG. 10-A refers to the example of the report given in FIG. 6A. In this case, the report is the income statement of Global Corporation for January, 1999. This report consists of four biz metrix. In other words, there are four logical groupings of data, and each one is structured according to its own format.

With reference to FIG. 10-A, the four biz metrix each appear as a row in the table. For example, Income Statement is one biz metrix. The structure of the information on the Income Statement consists of header information at the top that applies to the entire report. The fact that the Income Statement consists of two subdocuments or sub-reports is a biz metrix association or relationship and is stored in the table in FIG. 10-B. Revenues is a second logical grouping of data, and consequently is the second biz metrix. Expenses, the third biz metrix, is the third logical grouping of data. Financial details are the fourth biz metrix. Because the structure of the financial details for revenues is the same as the structure of the financial details for expenses, it is not necessary to have two different biz metrix for the financial details (such as, for example, revenue financial details and expense financial details). FIG. 10-A shows the income statement data in table form. The column headings are the attributes. The type of all four biz metrix is that of direct observation, meaning that these four biz metrix were observed and not calculated. The frequency of these four biz metrix is monthly. Each of these four biz metrix are for Global Corp.

With reference to FIG. 10-B, the nature of how the four biz metrix relate to each other is captured in biz metrix relationship. For example, biz metrix 1, the Income Statement (parent), consists of two defined submetrix or sub-documents or sub-reports: Revenues and Expenses (children). Revenues consist of information about the different revenue sources and the amounts associated with each source. Biz metrix 2, Revenue (parent), consists of one type of defined submetrix, Financial Details (child). Similarly, biz metrix 3, Expenses (parent), consists of one type of defined submetrix, Financial Details (child). Financial details do not consists of any defined submetrix. The income statement occurs once and only once in the document. The revenues block and the expenses block occur once and only once. However, the number of financial details that comprise the revenues and expenses block can be as few as zero and as many as 999.

With reference to FIG. 10-C, biz metrix rule allows the user to specify which party is associated with the biz metrix. In the example here, biz metrix can be defined for a type of party (e.g., company, customer, supplier), or a specific party (e.g., Global Corporation).

With reference to FIG. 10-D, the user determines the biz metrix variables. Looking at the Income Statement, there are six types of information, or six biz metrix variables, on the report. Some variables have relevant names that appear on the report. For example, the word amount appears on the report, and is a meaningful name for that variable (Name_TX). However, the header information at the top of the report has no variable names for the values that are given, so the user needs to give these pieces of information names. For example, "Income Statement" is the title of the report, so that the variable name could be Document Title. Assigning a biz metrix variable is similar to putting a label just prior to that piece of information. As another example, "January, 1999" is the month that the income statement refers to, so the variable name could be "Document Date." Descr_TX is the description of the metrix variable. SQL_TX is the query appropriate to selecting valid values for the variable. For example, if the variable was Party_ID and party information was stored in a table called Party, then the value of SQL_TX might be "select Party_ID, Party_Name_TX, from Party". This value could be used to build a list of values.

With reference to FIG. 10-E, the biz metrix detail associates the valid biz metrix variables with the valid biz metrix. In this example, there are eight rows of data, because the biz metrix variable called document or metrix title occur three times (Def_Metrix_Var_ID_FK=1, i.e., Doc Title): Income Statement, Revenues, and Expenses. The five remaining biz metrix variables occur only once. There is one word on the report, as shown in FIG. 6A, which can be used as a label, Amount. There are four default values on the report: 1) Income Statement is the default value for the document value for Income Statement, 2) SysDate is the default value for Document Produced Date for Income Statement, 3) Revenue is the default value for Document Title for Revenue, and 4) Expenses is the default value for Expenses. Finally, each biz metrix detail is required.

With reference to FIG. 10-F, the next step is for the user to enter information about the metrix, now that the biz metrix have all been defined. This information is entered in the table Gen_Metrix. In this case, there are eight metrix: one income statement, one revenues section, three financial details (in the revenues section), one expenses section, and two financial details (in the expenses section).

With reference to FIG. 10-G, the user then enters the metrix details, which are the actual pieces of information on the metrix. In other words, metrix details consist of the actual values instantiating the biz metrix. There are three metrix details for the first metrix, and two metrix details for each of the financial details, for a total of 13 metrix details. For example, software revenue was $250,000; hardware revenue was $100,000; services revenue was $75,000; salary expense was $200,000, and rent expense was $50,000.

FIG. 10-H shows how sample data would be stored in the table called Party, which is the physical instantiation of the entity called Party. The combination of the attributes Party_Name_TX, Last_Name_TX and First_Name_TX are sufficient to capture the wide variety of parties that exist, from firms such as, for example, Global Corp., to organizational units such as, for example, Division #1, to people such as, for example, John Smith and John Doe. Mergers and acquisitions are tracked through start dates and end dates. For example, ABC Corp. ended in Aug. 1,1998 when it merged with another company. The combined company, DEF Corp., began its life on Aug. 2,1998. Dates are also useful to track employment. For example, John Smith started employment at a firm on May 15, 1995, and ended his employment on Aug. 22, 1997.

Figure 11:
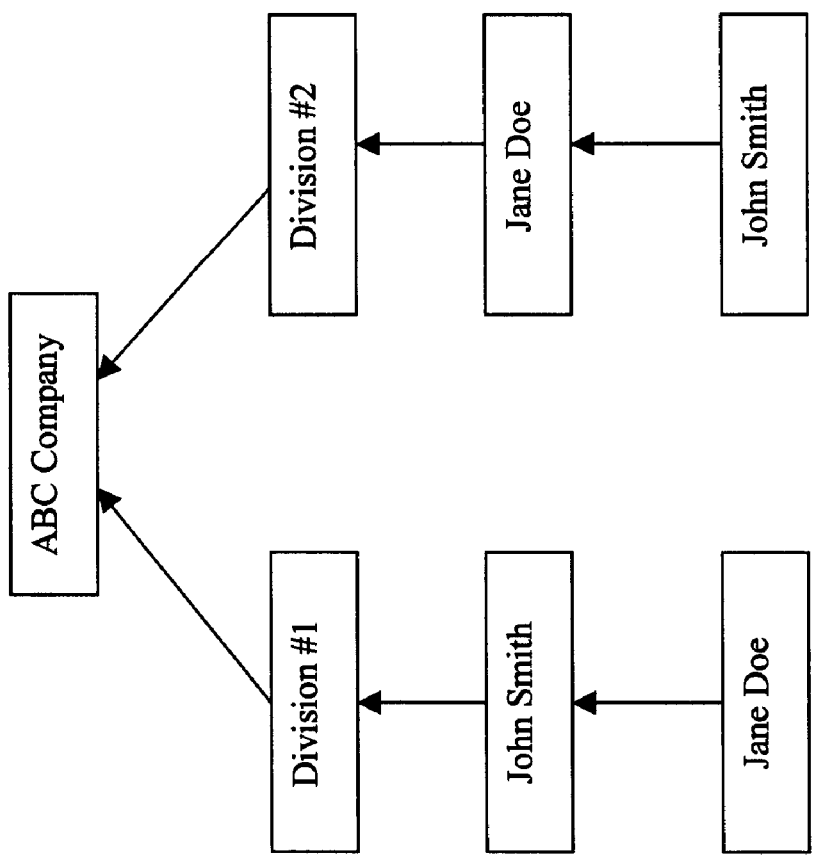
FIG. 11 is an example of a context-sensitive reporting relationship.

FIG. 10-I shows the relationships between the parties listed in FIG. 10-H. Division #1 is currently a part of Global Corp., and has been since Mar. 2, 1991. John Smith, a manager, is an employee of Division #1. It is important to note that this database design supports context-sensitive relationships, that is, it allows different relationships to exist in different contexts. For example, Jane Doe reports to John Smith in the context of Division #1, but John Smith reports to Jane Doe in the context of Division #2. In the context of Division #1, Jane Doe reported to John Smith starting Jun. 20, 1996, but stopped reporting to John when Jane left Aug. 22, 1997. In the context of Division #2, John Smith reported to Jane Doe starting Jun. 20, 1996, but stopped reporting to Jane when Jane left Aug. 22, 1997. The information in FIG. 10-H can be depicted graphically as shown in FIG. 11.

With reference to FIG. 10-J, the information stored in the defined party relationships table defines the rules that govern the specific relationships among the party types. For example, Rule 1 (Def_Party_Rel_ID=1) states departments report to divisions. Rules 2 and 3 state that employees work for departments, and employees work for divisions.

FIG. 10-K shows how sample data would be stored in the table called Domain, which is the physical instantiation of the entity called Domain. There are four domains, color, age, postal code, and customer service identifier. SQL_TX is the query appropriate to selecting valid values for the variable. For example, if the variable was color, then the value of SQL_TX might be "select color.name from color," which allows the user to build a list of values. Valid_Rule_TX is a function or expression that can return a True or False value can that validate that the information that is entered is correct. In this particular example, Valid_Rule_TX will return a value of true if the information TIN 5G6 is entered, because it follows the form of a Canadian postal code, which is letter, number, letter, space, number, letter, number. The minimum and maximum, 10 and 120, imply that the youngest age of a particular object is 10, and the oldest is 120.

FIG. 10-L shows how sample data would be stored in the table called Virtual_Attrib, which is the physical instantiation of the entity called Virtual_Attrib. In this Figure, there are four virtual attributes: 1, 2, 3, and 4. These four virtual attributes are given names in the Virtual Value table, that is, FIG. 10-P.

FIG. 10-M shows how sample data would be stored in the table called Value_List, which is the physical instantiation of the entity called Value_List. This table shows the valid values for each domain. In the example, there are three valid values for color: red, green, and blue; and there are two valid values for gender: male and female.

FIG. 10-N shows how sample data would be stored in the table called COB_Table, which is the physical instantiation of the entity called COB_Table. The COB Table consists of all the virtual tables. In this example, employee and customer are two virtual tables that are based on the Party and Party Role tables. The customer rows are selected using the SQL statement that is stored in the three clauses: Select Party_Role_ID, Party_ID, from Party_Role where Z_Party_CD='Cust'.

FIG. 10-0 shows how sample data would be stored in the table called COB_Table_Dtl, which is the physical instantiation of the entity called COB_Table_Dtl. In this particular example, Gen_Metrix and Gen_Access_Rule are highly referenced tables, because there are many entities which need numeric information and access rule details tracked about them.

FIG. 10-P shows how sample data would be stored in the table called Virtual_Value, which is the physical instantiation of the entity called Virtual_Value. In this example, the customer service identifier, is associated with two names, one in English (Cust Service ID), and one in French (Nombre du service client).

FIG. 10-Q shows how sample data would be stored in the table called Valid_Var_Rule, which is the physical instantiation of the entity called Valid_Var_Rule. Rule 1 states that the virtual customer table is associated with ABC Company, with the association starting Jan. 1,1995, and Rule 2 states that the virtual employee table is associated with John Smith, with the association starting on Jan. 1,1996.

FIG. 10-R shows how sample data would be stored in the table called Valid_Var_Rule_Dtl, which is the physical instantiation of the entity Valid_Var_Rule_Dtl. In this particular example, a party must have at least one customer service number, and have a maximum of three customer service numbers.

FIG. 10-S shows how sample data would be stored in the table called Functn, which is the physical instantiation of the entity called Functn. In this example, there are two functions given: a maximum function and a minimum function. The syntax for these two functions is: (value number).

FIG. 10-T shows how sample data would be stored in the table called Functn_Dtl, which is the physical instantiation of the entity called Functn_Dtl. In this example, the maximum function is applied to age.

In summary, according to a method of the present invention, for defining, generating, storing and displaying complex information, in a secure, single user or multiuser environment:

The user creates a biz metrix by first articulating the variables, that is, the data elements that will appear on the metrix, by specifying the variables' names, data types, descriptions, classes, and the SQL queries appropriate to selecting valid values for the variables, stored in a relational database table called Biz_Metrix_Var.

The user then creates the biz metrix components, by specifying their types (direct observation or report), frequencies (e.g., daily, yearly), names, and descriptions, stored in a relational database table called Biz_Metrix.

The user then defines the structure or relationships of the biz metrix, by specifying the name(s) of one or more subordinate biz metrix (child biz metrix) structure, and the maximum and minimum number of child metrix objects, stored in a relational database table called Biz_Metrix_Rel.

The user then defines the data elements that will appear on a metrix, by specifying a particular biz metrix and biz metrix variable, and the biz metrix details' types, label, default value, the Boolean value for whether or not the value is required, and a text field storing a rule, all stored in a relational database table called Biz_Metrix_Dtl. The user will then define the rule, by specifying whether it is an arithmetic or string or time/date or conversion or custom function, and by specifying the operator, as appropriate to the type of function.

The user then creates the metrix, by specifying that it is to be an instantiation of a particular biz metrix, the superordinate or parent metrix, the COB table and COB link ID or CD (which connects this table to every other table in the database), and the metrix, frequencies, statuses, document dates, calculation dates, the observation start dates, the observation end dates, and a description, stored in a relational database table called Gen_Metrix.

The user then defines the metrix details, by specifying the particular metrix, the particular biz metrix variable, the type of metrix detail, the text value or numeric value or date value of the metrix detail, a Boolean value for whether or not the metrix detail is required, and a label for the metrix detail, stored in a relational database table called Metrix_Dtl_Gen.

The user then defines the potential types of subjects of the biz metrix, by specifying the names of the biz metrix subjects, stored in a relational database table called Biz_Metrix_Rule.

Figure 12:
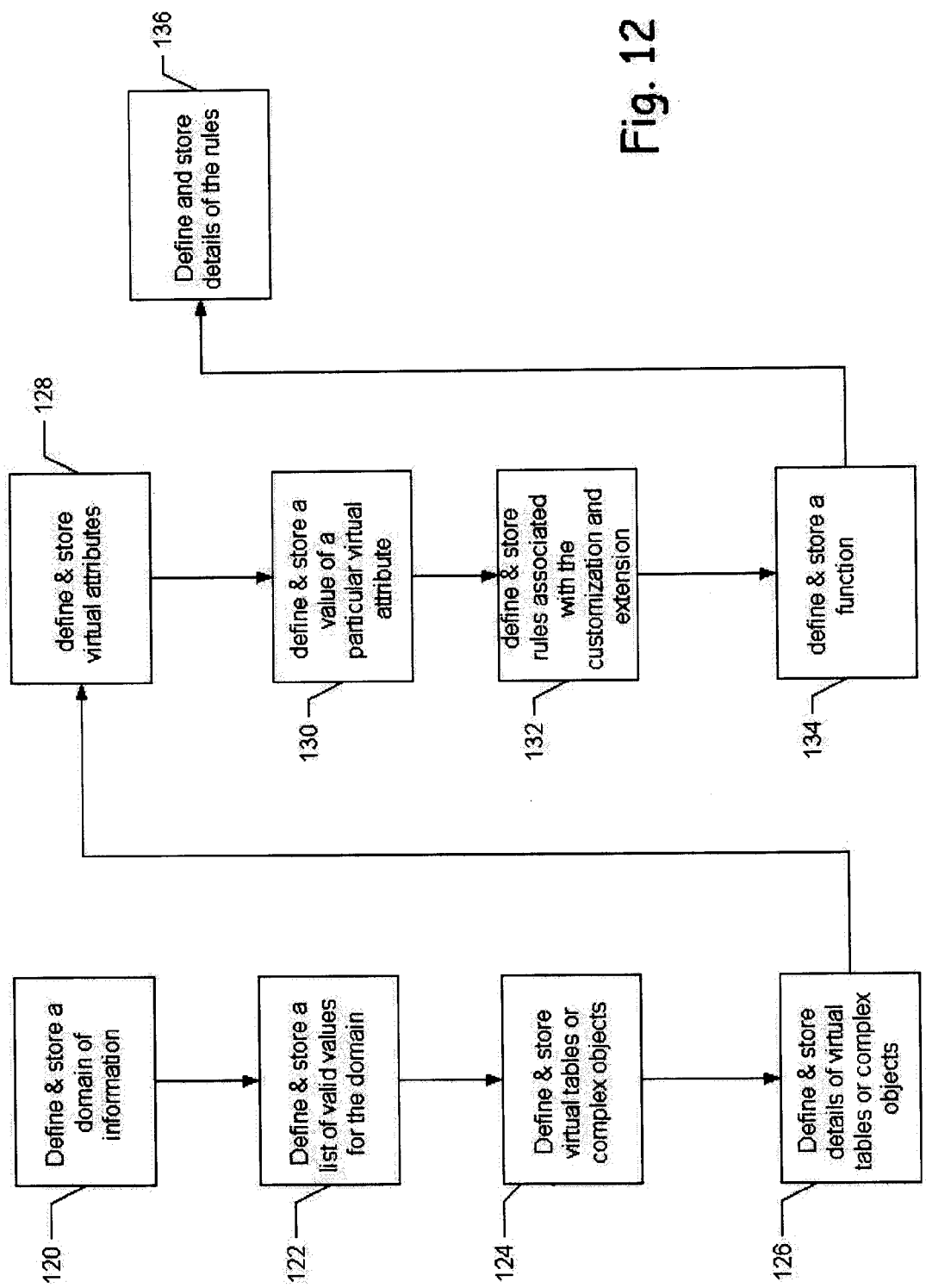
FIG. 12 is a flowchart summarizing the method according to embodiments of the present invention.

In another aspect, the present invention provides a method for entering, storing, processing, and displaying information about a party, in a secure, single user or multi-user environment. Specifically, with reference to the flowchart in FIG. 12:

The user defines the party (an individual, collection of individuals, an organization unit, etc.), by specifying the name of the party, a Boolean storing whether or not the party is a person, the start date of the party, and the end date of the party, stored in a relational database table called Party.

The user then defines the different roles or relationships among the parties, by specifying the type of party role, the type of relationship, the name of the superordinate (parent) party, and the start date and end date of these associations, stored in a relational database table called Party_Role.

The user then defines the rules that govern the parties' roles and relationships, by specifying the superordinate (parent) party, the subordinate (child) party, the types of the parties' relationships, and the start date and end dates of these relationships, stored in a relational database table called Def_Party_Rel. Party, Party_Role, and Defined_Party_Relationship can represent any party (such as, for example, person or organization) of any type, and can represent any relationship between any party of any type, including contingent or context-sensitive relationships.

In another aspect, a method of the present invention provides a method of customizing and extending the database design, including entering, storing, processing, and displaying information in a single user or multi-user environment, single client or multi-client environment (with reference to the flowchart in FIG. 12):

The user defines the domain of the information (such as, for example, color or gender) by specifying the name of the domain, a data type, description, default, an SQL statement, a valid rule, a minimum, a maximum, a precision, and a length, stored in a relational database table called Domain (at 120).

The user then defines the list of valid values for the domain, by specifying one of the following three things: a numeric value, a text value, or a date value, stored in a relational database table called Value_List (at 122).

The user then defines the virtual tables, or complex objects, by specifying the name of the virtual table, the SQL select clause, the SQL from clause, the SQL where clause, a description, and the owner, in a relational database table called COB_Table (at 124).

The user then defines the details of the COB_Table, by specifying all the tables that have a high level of interaction with the other tables in the database, as attributes, in a relational database table called COB_Table_Dtl (at 126).

The user then defines the virtual attributes, by specifying the code of the virtual attribute, and the data type, stored in a relational database table called Virtual_Attrib (at 128).

The user then defines the value of a particular virtual attribute, by specifying one of the following: a numeric value, a text value, or a date value, stored in a relational database table called Virtual_Value (at 130).

The user then defines the rules associated with the customization and extension, by specifying which party is associated with which specific object (i.e., table), stored in a relational database table called Valid_Var_Rule (at 132).

The user then defines the details of the rules, by specifying which party is associated with which virtual attributes, the valid variable rule, and the minimum and maximum number of times it can appear, stored in a relational database table called Valid_Var_Rule_Dtl (at 134).

The user then defines the function, by specifying the name of the function, its syntax, and a description, stored in a relational database table called Functn (at 136).

Finally, the user defines the function detail, by specifying the name of the detail, an indication of whether or not the detail can repeat, an indication of whether or not the detail is required, a description of the detail, and a default value for the detail, stored in a relational database table called Functn_Dtl.

Thus are provided methods, systems and devices for providing input, analysis, and output capability for multidimensional information. One skilled in the art will appreciate that the present invention can be practiced by other than the described embodiments, which are presented for purposes of illustration and not limitation, and the present invention is limited only by the claims that follow.

We claim:

1. A method of database design comprising:

defining and storing in a first relational database table a domain of information by specifying a name of the domain, a data type, a description, a default, a SQL statement, a valid rule, a minimum, a maximum, a precision, and a length;

defining and storing in a second relational database table a list of valid values for the domain, by specifying one of: a numeric value, a text value, and a date value;

defining and storing in a third relational database table virtual tables by specifying a name of the virtual table, a SQL select clause, a SQL from clause, a SQL where clause, a description, and an owner;

defining, in a COB_Table_Dtl relational database table, details of the third relational database table, by specifying as attributes a first group of tables that have a higher level of interaction with he other tables in the database, as compared to a second group of tables;

defining and storing in a fourth relational database table, virtual attributes, by specifying a code of the virtual attribute, and a data type;

defining and storing in a fifth relational database table, a value of a particular virtual attribute, by specifying one of: a numeric value, a text value, and a date value;

defining and storing in a sixth relational database table, rules associated with customization and extension of the database, by specifying at least one party associated with at least one specific object;

defining and storing in a seventh relational database table, details of the rules, by specifying at least one party is associated with at least one virtual attribute, a valid variable rule, and a minimum and maximum number of times each of the details of the rules can appear; and defining and storing in an eighth relational database table, a function, by specifying a name of the function, its syntax, and a description.

2. A method comprising:

defining and storing in a first relational database table a domain of information;

defining and storing in a second relational database table a list of valid values for the domain;

defining and storing in a third relational database table virtual tables;

defining, in a fourth relational database table, details of the third relational database table;

defining and storing in a fifth relational database table, virtual attributes;

defining and storing in a sixth relational database table, a value of a particular virtual attribute;

defining and storing in a seventh relational database table, rules associated with customization and extension of a database;

defining and storing in an eighth relational database table, details of the rules; and defining and storing in a ninth relational database table, a function.

3. A method as in claim 2 wherein the defining and storing in the first relational database table comprises:

specifying at least one of a name of the domain, a data type, a description, a default, a SQL statement, a valid rule, a minimum, a maximum, a precision, and a length.

4. A method as in claim 2 wherein the defining and storing in the second relational database table comprises:

specifying one of: a numeric value, a text value, and a date value.

5. A method as in claim 2 wherein the defining and storing in the third relational database table comprises:

specifying at least one of a name of the virtual table, a SQL select clause, a SQL from clause, a SQL where clause, a description, and an owner.

6. A method as in claim 2 wherein the defining and storing in the fourth relational database table comprises:

specifying as attributes a first group of tables that have a higher level of interaction with other tables in the database, as compared to a second group of tables.

7. A method as in claim 2 wherein the defining and storing in the fifth relational database table comprises:

specifying a code of the virtual attribute, and a data type.

8. A method as in claim 2 wherein the defining and storing in the sixth relational database table comprises:

specifying one of: a numeric value, a text value, and a date value.

9. A method as in claim 2 wherein the defining and storing in the seventh relational database table comprises:

specifying at least one party is associated with at least one specific object.

10. A method as in claim 2 wherein the defining and storing in the eighth relational database table comprises:

specifying at least one party is associated with at least one virtual attribute, a valid variable rule, and a minimum and maximum number of times each of the details of the rules can appear.

11. A method as in claim 2 wherein the defining and storing in the ninth relational database table comprises:

specifying a name of the function, its syntax, and a description.

12. A method for defining, generating, storing and displaying complex information comprising:

creating and storing in a first relational database table a biz metrix by first articulating variables that will appear on the biz metrix, by specifying the variables' names, data types, descriptions, domains, and SQL queries appropriate to selecting valid values for the variables;

creating and storing in a second relational database table the biz metrix components, by specifying their types, frequencies, names, and descriptions;

defining and storing in a third relational database table the structure or relationships of the biz metrix, by specifying the names of one or more subordinate biz metrix structure, and the maximum and minimum number of child metrix objects;

defining and storing in a fourth relational database table data elements that will appear on a metrix, by specifying a particular biz metrix and biz metrix variable, and biz metrix details' types, label, default value, a Boolean value for whether or not the data element is required, and a text field storing a rule;

defining the rule, by specifying whether it is an arithmetic or string or time/date or conversion or custom function, and by specifying the operator, as appropriate to the type of rule;

creating and storing in a fifth relational database table the metrix, by specifying that it is to be an instantiation of a particular biz metrix, a superordinate or parent metrix, a COB table and COB link ID or CD, and the metrix, frequencies, statuses, document dates, calculation dates, observation start dates, the observation end dates, and a description;

defining and storing in a sixth relational database table the metrix details, by specifying the particular metrix, the particular biz metrix variable, the type of metrix detail, the text value or numeric value or date value of the metrix detail, a Boolean value for whether or not the metrix detail is required, and a label for the metrix detail; and defining and storing in a seventh relational database table potential types of parties of the biz metrix, by specifying the names of biz metrix subjects.

13. A method for entering, storing, processing, and displaying information about a party, the method comprising:

defining information about the party by specifying the name of the party, a value indicating whether or not the party is a person, a start date of the party, and an end date of the party;

storing the information about the party in a first relational database table;

defining different roles or relationships among the parties, by specifying additional information including a type of party role, a type of relationship, a name of a superordinate party, and a start date and end date of these associations;

storing the additional information about the party in a second relational database table; and defining and storing, in a third relational database table, rules that govern the parties' roles and relationships, by specifying the superordinate party, a subordinate party, types of the parties' relationships, and a start date and end date of these relationships.

* * * * *